US012749325B2

(12) United States Patent
Wang et al.

(10) Patent No.: US 12,749,325 B2
(45) Date of Patent: Sep. 29, 2026

(54) DATA ANNOTATION METHOD AND APPARATUS, AND FINE-GRAINED RECOGNITION METHOD AND APPARATUS

(71) Applicant: Huawei Cloud Computing Technologies Co., Ltd., Guizhou (CN)

(72) Inventors: Zichen Wang, Shanghai (CN); Xiaopeng Zhang, Shanghai (CN); Qi Tian, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 464 days.

(21) Appl. No.: 17/989,068

(22) Filed: Nov. 17, 2022

(65) Prior Publication Data

US 2023/0087292 A1 Mar. 23, 2023

Related U.S. Application Data

(63) Continuation of application No. PCT/CN2021/088405, filed on Apr. 20, 2021.

(30) Foreign Application Priority Data

May 18, 2020 (CN) ......................... 202010418518.2

(51) Int. Cl.
*G06V 20/70* (2022.01)
*G06V 10/764* (2022.01)
(Continued)

(52) U.S. Cl.
CPC ............ *G06V 20/70* (2022.01); *G06V 10/764* (2022.01); *G06V 10/774* (2022.01); *G06V 10/82* (2022.01)

(58) Field of Classification Search
CPC .... G06V 10/764; G06V 10/774; G06V 10/82; G06V 10/22; G06V 2201/07;
(Continued)

(56) References Cited

U.S. PATENT DOCUMENTS

2020/0202210 A1* 6/2020 Kushnir ................... G06N 3/04
2021/0327126 A1* 10/2021 Hu ......................... G06V 10/82

FOREIGN PATENT DOCUMENTS

CN 107451602 A 12/2017
CN 108898087 A 11/2018
(Continued)

OTHER PUBLICATIONS

Feng, HuaMin, and Tat-Seng Chua. "A bootstrapping approach to annotating large image collection." Proceedings of the 5th ACM SIGMM international workshop on Multimedia information retrieval. 2003. (Year: 2003).*
(Continued)

*Primary Examiner* — Sumati Lefkowitz
*Assistant Examiner* — Connor L Hansen
(74) *Attorney, Agent, or Firm* — WOMBLE BOND DICKINSON (US) LLP

(57) ABSTRACT

This application relates to the field of image annotation and recognition in the field of artificial intelligence technologies, and in particular, to a data annotation method. The method includes: using at least two different classification models; pretraining one of the classification models as an initial classification model, and annotating a label for data in a to-be-annotated source dataset as initial data by using the pretrained classification model; and controlling the classification models to perform alternating training and data annotation a quantity of times. Operations of current training and current data annotation include: obtaining data that is re-annotated with a label by a previously trained classifica-
(Continued)

tion model, selecting a first part of the data to train a current classification model, and re-annotating, by the trained current classification model, a label for a second part of data that is not selected.

10 Claims, 9 Drawing Sheets

(51) Int. Cl.
*G06V 10/774* (2022.01)
*G06V 10/82* (2022.01)

(58) Field of Classification Search
CPC ........ G06V 20/70; G06N 3/044; G06N 3/045; G06N 3/0464; G06N 3/09; G06N 3/08; G06N 20/00; G06N 3/04; G06F 18/241
See application file for complete search history.

(56) References Cited

FOREIGN PATENT DOCUMENTS

| | | | |
|---|---|---|---|
| CN | 109902716 | A | 6/2019 |
| CN | 110059734 | A | 7/2019 |
| CN | 110188767 | A | 8/2019 |
| CN | 110490884 | A | 11/2019 |
| CN | 110599445 | A | 12/2019 |
| CN | 111079602 | A | 4/2020 |
| CN | 111126459 | A | 5/2020 |
| EP | 3543917 | A1 | 9/2019 |

OTHER PUBLICATIONS

Zhang, Ning, et al. "Part-based R-CNNs for fine-grained category detection." Computer VisionâECCV 2014: 13th European Conference, Zurich, Switzerland, Sep. 6-12, 2014, Proceedings, Part I 13. Springer International Publishing, 2014. (Year: 2014).*
Shin, Hoo-Chang, et al. "Learning to read chest x-rays: Recurrent neural cascade model for automated image annotation." Proceedings of the IEEE conference on computer vision and pattern recognition. 2016. (Year: 2016).*
Yin Cui et al., Large Scale Fine-Grained Categorization and Domain-Specific Transfer Learning, arXiv:1806.06193v1 [cs.CV] Jun. 16, 2018, 10 pages.
Jiangfan Han et al., Deep Self-Learning From Noisy Labels, arXiv:1908.02160v2 [cs.CV] Aug. 20, 2019, 10 pages.
Leonid Karlinsky et al., RepMet: Representative-based metric learning for classification and few-shotobject detection, arXiv:1806.04728v3 [cs.CV] Nov. 18, 2018, 10 pages.
Michael A Hedderich et al: "Training a Neural Network in a Low-Resource Setting on Automatically Annotated Noisy Data", arxiv.org, Cornell University Library, 201 Olin Library Cornell University Ithaca, NY 14853, Jul. 2, 2018 (Jul. 2, 2018), XP081241065, total 7 pages.

* cited by examiner

DATA ANNOTATION METHOD AND APPARATUS, AND FINE-GRAINED RECOGNITION METHOD AND APPARATUS

CROSS-REFERENCE TO RELATED APPLICATIONS

This application is a continuation of International Patent Application PCT/CN2021/088405, filed on Apr. 20, 2021, which claims priority to Chinese Patent Application No. 202010418518.2, filed on May 18, 2020. The disclosures of the aforementioned applications are hereby incorporated by reference in their entireties.

TECHNICAL FIELD

This application relates to the field of mode recognition and image processing technologies, and particularly refers to a data annotation method and apparatus, a fine-grained recognition model training method and apparatus, a fine-grained recognition method and apparatus, a computing device, and a medium.

BACKGROUND

A fine-grained image recognition task widely exists in industrial and daily life, for example, vehicle recognition in self-driving. Information such as a manufacturer, a style, and a production age of a vehicle are recognized by using an image photographed by a camera, to assist in a decision of self-driving. A traffic sign usually represents information by using a simple line, and is also a fine-grained classification task, which provides a criterion for a behavior of a self-driving vehicle. In addition, the fine-grained image recognition task is also widely used in a mobile phone, such as recognition of everything such as flowers, birds, dogs, and food. Therefore, it may be useful to resolve fine-grained image recognition, which is important for both industry and life.

Fine-grained image recognition is division of different subcategories in a same basic category, for example, a vehicle style, a bird type, and a dog variety. A difference from a common image task lies in that a category to which an image belongs is finer, and fine-grained image recognition currently has a wide application scenario in industry and life.

Currently, academically, there are various technologies for a fine-grained classification recognition task, including a method based on fine-grained feature learning, a method based on a visual attention mechanism, and a method based on target block detection. The foregoing methods promote development of a fine-grained classification task. However, there are still some problems, for example, a problem that data annotation is difficult, and a quantity of annotated samples is small, which causes overfitting during training of a fine-grained image recognition model, and consequently recognition accuracy of an obtained model is not high enough.

Therefore, in this background, how to resolve a data annotation problem and increase a quantity of annotated samples to mitigate an overfitting problem during training of a fine-grained image recognition model and improve recognition accuracy is a technical problem to be resolved.

SUMMARY

In view of this, a main objective of this application is to provide a data annotation method and apparatus, a fine-grained recognition model training method and apparatus, a fine-grained recognition method and apparatus, a computing device, and a medium, to automatically annotate data, and further train a corresponding classification model by using data annotated in the process, thereby effectively reducing generation of overfitting in a recognition process due to a small amount of sample data. This resolves a problem that data annotation is difficult, and a quantity of annotated samples is small, which causes overfitting during training of a classification model, and consequently recognition accuracy of an obtained model is not high enough, thereby improving recognition accuracy of the obtained model.

To achieve the foregoing objective, a first aspect of this application provides a data annotation method, including:

- using at least two classification models with different structures;
- pretraining one of the classification models by using a target dataset with a target annotation type label, and annotating a label for data in a to-be-annotated source dataset by using the pretrained classification model; and
- controlling the classification models to perform alternating training and data annotation a quantity of times, where the pretrained classification model and data annotated with a label by using the pretrained classification model are used as an initial classification model and initial data annotated with a label in the alternating training and data annotation.

In the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

As described above, when source data is annotated, in this application, the classification models (for example, two classification models may be used) are used for alternating training and alternating annotation, to implement progressive automatic label annotation and simultaneous alternating training of the classification models. In the progressive iterative and coordinated training mechanism, a large amount of annotated data that is automatically annotated may be introduced into a classification model training process in an iteration process, thereby effectively reducing generation of overfitting in the training process due to a small amount of sample data, and improving recognition performance. In addition, training data input into the classification models is different in an iterative and coordinated training process, to effectively prevent the classification models from being trained to be "approximate" to each other, thereby effectively avoiding homogeneity of labels of annotated data. Moreover, in this application, the classification model is pretrained by using the target dataset with the target annotation type label, so that the pretrained model can have higher performance, and can annotate the target annotation type label for source data more quickly in subsequent iterative training.

In a possible embodiment of the first aspect, the selection is performed based on stability of an annotation of each piece of data.

As described above, data corresponding to a label whose data annotation has high stability may be reserved as a training set to train the classification model, so that a training effect is better.

In a possible embodiment of the first aspect, when the stability is measured by using information entropy, the selecting a part of data includes: calculating information entropy of a data annotation of each piece of data based on each label annotated on the data, and selecting the data based on an order of values of the information entropy, where the value of the information entropy is inversely related to stability of the data annotation.

As described above, a manner of calculating stability of the data annotation is not unique, and the stability of the data annotation may be measured by using the information entropy according to a requirement. In some embodiments, data may be clustered, and a label that can express label importance of a class group in which the data is located is enabled to have a data annotation with relatively high stability.

In a possible embodiment of the first aspect, the source data and target data have labels of a same basic classification; and the target annotation type label is a label of a further fine-grained classification in the basic classification.

As described above, when annotated data with a fine-grained classification label is used as a training set for pretraining, this application may be used to generate a fine-grained label for a set of a large amount of data with a generic category label. In addition, with reference to the foregoing technical solution, even if there is not much annotated data with a fine-grained classification label used as a training set, an overfitting problem in fine-grained recognition can be effectively mitigated.

A second aspect of this application further provides a data annotation method, including:

- using at least two classification models with different structures; and
- controlling the classification models to perform alternating training and data annotation a quantity of times, where in the alternating training and data annotation, a part of data used for training an initial classification model has a target annotation type label.

In the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

As described above, in this application, the classification models are used for alternating training and alternating annotation, to implement progressive automatic label annotation and simultaneous alternating training of the classification models. In the progressive iterative and coordinated training mechanism, the target annotation type label may be introduced into a model, and a large amount of annotated data that is automatically annotated may be introduced into a classification model training process in an iteration process, thereby effectively reducing generation of overfitting in the training process due to a small amount of sample data, and improving recognition performance. In addition, training data input into the classification models is different in an iterative and coordinated training process, to effectively prevent the classification models from being trained to be “approximate” to each other, thereby effectively avoiding homogeneity of labels of annotated data.

In a possible embodiment of the second aspect, before the alternating training and data annotation are performed, the method further includes: pretraining one of the classification models by using a target dataset of annotated data with the target annotation type label.

As described above, the classification model is pretrained, so that the classification model has a feature. The classification model is pretrained by using the target dataset with the target annotation type label, so that the pretrained model can have high performance, and can annotate the target type label for source data more quickly in subsequent iterative training.

In a possible embodiment of the second aspect, the selection is performed based on stability of an annotation of each piece of data.

As described above, data corresponding to a label whose data annotation has high stability may be reserved as a training set to train the classification model, so that a training effect is better.

In a possible embodiment of the second aspect, when the stability is measured by using information entropy, the selecting a part of data includes: calculating information entropy of a data annotation of each piece of data based on each label annotated on the data, and selecting the data based on an order of values of the information entropy, where the value of the information entropy is inversely related to stability of the data annotation.

As described above, a manner of calculating stability of the data annotation is not unique, and the stability of the data annotation may be measured by using the information entropy according to a requirement.

In a possible embodiment of the second aspect, the data used to train the initial classification model has labels of a same basic classification; and the target annotation type label is a label of a further fine-grained classification in the basic classification.

As described above, when annotated data with a fine-grained classification label is used as a training set for pretraining, this application may be used to generate a fine-grained label for a set of a large amount of data with a generic category label. In addition, with reference to the foregoing technical solution, even if there is not much annotated data with a fine-grained classification label used as a training set, an overfitting problem in fine-grained recognition can be effectively mitigated.

A third aspect of this application further provides a data annotation apparatus, including:

- an invoking module, configured to invoke at least two classification models with different structures;
- a first pretraining module, configured to pretrain one of the classification models by using a target dataset with a target annotation type label;
- an initial annotation module, configured to annotate a label for data in a to-be-annotated source dataset by using the pretrained classification model; and
- a control module, configured to control the classification models to perform alternating training and data annotation a quantity of times, where the pretrained classification model and data annotated with a label by using the pretrained classification model are used as an initial classification model and initial data annotated with a label in the alternating training and data annotation; and in the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

As described above, in this application, the classification models are used for alternating training and alternating annotation, to implement progressive label annotation and simultaneous training of the classification models. In the progressive iterative and coordinated training mechanism, a large amount of annotated data that is automatically annotated may be introduced into a classification model training process in an iteration process, thereby effectively reducing generation of overfitting in a recognition process due to a small amount of sample data, and improving recognition performance. In addition, in this application, the pretraining module is used to pretrain the classification model by using the target dataset with the target annotation type label, so that the pretrained model can have higher performance, and can annotate the target type label for source data more quickly in subsequent iterative training. Moreover, training data input into the classification models is different in an iterative and coordinated training process, to effectively prevent the classification models from being trained to be "approximate" to each other, thereby effectively avoiding homogeneity of labels of annotated data.

In a possible embodiment of the third aspect, the selection is performed based on stability of an annotation of each piece of data.

As described above, data corresponding to a label whose data annotation has high stability may be reserved as a training set to train the classification model, so that a training effect is better.

In a possible embodiment of the third aspect, when the stability is measured by using information entropy, the selecting a part of data includes: calculating information entropy of a data annotation of each piece of data based on each label annotated on the data, and selecting the data based on an order of values of the information entropy, where the value of the information entropy is inversely related to stability of the data annotation.

As described above, a manner of calculating stability of the data annotation is not unique, and the stability of the data annotation may be measured by using the information entropy according to a requirement.

In a possible embodiment of the third aspect, the source data and target data have labels of a same basic classification; and the target annotation type label is a label of a further fine-grained classification in the basic classification.

As described above, when annotated data with a fine-grained classification label is used as a training set for pretraining, this application may be used to generate a fine-grained label for a set of a large amount of data with a generic category label. In addition, with reference to the foregoing technical solution, even if there is not much annotated data with a fine-grained classification label used as a training set, an overfitting problem in fine-grained recognition can be effectively mitigated.

A fourth aspect of this application further provides another data annotation apparatus, including:

an invoking module, configured to invoke at least two classification models with different structures; and a control module, configured to control the classification models to perform alternating training and data annotation a quantity of times, where in the alternating training and data annotation, a part of data used for training an initial classification model has a target annotation type label; and in the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

As described above, in this application, the classification models are used for alternating training and alternating annotation, to implement progressive automatic label annotation and simultaneous alternating training of the classification models. In the progressive iterative and coordinated training mechanism, a large amount of annotated data that is automatically annotated may be introduced into a classification model training process in an iteration process, thereby effectively reducing generation of overfitting in a recognition process due to a small amount of sample data, and improving recognition performance. In addition, training data input into the classification models is different in an iterative and coordinated training process, to effectively prevent the classification models from being trained to be "approximate" to each other, thereby effectively avoiding homogeneity of labels of annotated data.

In a possible embodiment of the fourth aspect, the apparatus further includes: a second pretraining module, configured to pretrain the initial classification model by using a target dataset of annotated data with the target annotation type label.

As described above, in this application, the classification model is pretrained by using the target dataset with the target annotation type label, so that the pretrained model can have higher performance, and can annotate the target type label for source data more quickly in subsequent iterative training.

In a possible embodiment of the fourth aspect, the selection is performed based on stability of an annotation of each piece of data.

As described above, data corresponding to a label whose data annotation has high stability may be reserved as a training set to train the classification model, so that a training effect is better.

In a possible embodiment of the fourth aspect, when the stability is measured by using information entropy, the selecting a part of data includes: calculating information entropy of a data annotation of each piece of data based on each label annotated on the data, and selecting the data based on an order of values of the information entropy, where value of the information entropy is inversely proportional to stability of the data annotation.

As described above, a manner of calculating stability of the data annotation is not unique, and the stability of the data annotation may be measured by using the information entropy according to a requirement.

In a possible embodiment of the fourth aspect, the data used for the classification model has labels of a same basic classification; and the target annotation type label is a label of a further fine-grained classification in the basic classification.

As described above, when annotated data with a fine-grained classification label is used as a training set for pretraining, this application may be used to generate a fine-grained label for a set of a large amount of data with a generic category label. In addition, with reference to the foregoing technical solution, even if there is not much annotated data with a fine-grained classification label used as a training set, an overfitting problem in fine-grained recognition can be effectively mitigated.

A fifth aspect of this application further provides a fine-grained recognition model training method, including:

obtaining a source dataset that has a fine-grained classification label and that is annotated according to any method in the foregoing technical solutions; and training a classification model by using the source dataset annotated with the fine-grained classification label, to obtain a trained classification model used for fine-grained recognition.

In a possible embodiment of the fifth aspect, the method further includes: obtaining a target dataset annotated with the fine-grained classification label, and retraining the classification model by using the target dataset.

As described above, the classification model is retrained by using the target dataset annotated with the fine-grained classification label, that is, the classification model is fine adjusted, so that precision of the classification model can be improved.

A sixth aspect of this application further provides a fine-grained recognition model training apparatus, including:

a first obtaining module, configured to obtain a source dataset that has a fine-grained classification label and that is annotated according to any method in the foregoing technical solutions; and a first training module, configured to train a classification model by using the source dataset annotated with the fine-grained classification label, to obtain a trained classification model having fine-grained recognition.

In a possible embodiment of the sixth aspect, the apparatus further includes:

a second obtaining module, configured to obtain a target dataset annotated with the fine-grained classification label; and a second training module, configured to retrain the classification model by using the target dataset.

As described above, the classification model is retrained by using the target dataset annotated with the fine-grained classification label, that is, the classification model is fine adjusted, so that precision of the classification model can be provided.

A seventh aspect of this application further provides a fine-grained recognition method, including:

obtaining a to-be-recognized target image; and inputting the to-be-recognized target image into a classification model trained by using any method in the foregoing technical solutions, to perform fine-grained recognition on the target image by using the classification model.

In a possible embodiment of the seventh aspect, the method is applied to one of the following: recognition of a collected image in a self-driving system of a vehicle; and recognition of a collected image by a mobile terminal.

An eighth aspect of this application further provides a fine-grained recognition apparatus, including:

an image obtaining module, configured to obtain a to-be-recognized target image; and an input module, configured to input the to-be-recognized target image into a classification model that used for fine-grained recognition and that is trained by using any method in the foregoing technical solutions, to perform fine-grained recognition on the target image by using the classification model.

A ninth aspect of this application further provides a computing device, including:

a bus;

a communications interface, where the communications interface is connected to the bus;

at least one processor, where the at least one processor is connected to the bus; and at least one memory, where the at least one memory is connected to the bus and stores program instructions, and when the program instructions are executed by the at least one processor, the at least one processor is enabled to perform any method in the foregoing technical solutions.

A tenth aspect of this application further provides a computer-readable storage medium. The computer-readable storage medium stores program instructions, and when the program instructions are executed by a computer, the computer is enabled to perform any method in the foregoing technical solutions.

An eleventh aspect of this application further provides a computer program. When the program is executed by a computer, the computer is enabled to implement any method in the foregoing technical solutions.

In conclusion, in addition to resolving the foregoing technical problems, compared with the conventional technologies described in embodiments, this application can resolve the following problems in the conventional technologies.

Compared with a conventional technology 1 described in an embodiment, in this application, a bilinear network model is not used, and therefore data can be automatically annotated with low annotation costs.

Compared with a conventional technology 2 described in an embodiment, in this application, a relatively large amount of automatically annotated data is introduced, that is, data corresponding to a preferred annotation label in an iterative training process, thereby effectively mitigating an overfitting problem caused in recognition by a small quantity of training samples, and improving recognition performance. This is particularly applicable to training and application of a fine-grained image recognition process.

Compared with a conventional technology 3 described in an embodiment, in this application, automatic recognition training is not performed by using a method based on target block detection, and a person does not need to annotate a key location. Therefore, classification is relatively accurate, and an operation speed is not affected by a person.

DESCRIPTION OF EMBODIMENTS

Figure 1:
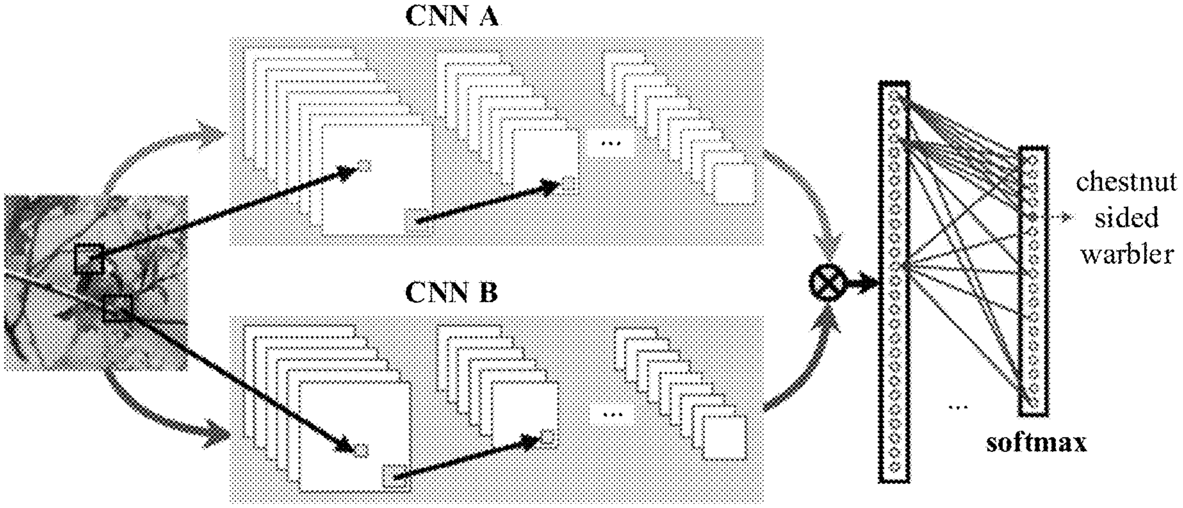
FIG. 1 is a schematic diagram of a neural network model based on bilinear convolution in a conventional technology 1.

The following description relates to "some embodiments", which describe subsets of all possible embodiments, but it may be understood that "some embodiments" may be same or different subsets of all the possible embodiments and may be combined with each other without conflict.

In the following description, terms "first\second\third, and the like", or a module A, a module B, a module C, and the like are merely used to distinguish between similar objects, and do not represent a specific order of objects. It may be understood that specific orders or sequences may be interchanged when allowed, so that embodiments of this application described herein can be implemented in an order other than those shown or described herein.

In the following description, numerals representing operations, such as S110, S120 . . . , do not necessarily indicate that execution is performed based on the operations. A previous operation and a current operation may be interchanged in terms of an order or performed simultaneously.

Unless otherwise defined, all technical and scientific terms used herein have the same meanings as those commonly understood by a person skilled in the art belonging to this application. The terms used in this specification are merely intended to describe embodiments of this application, and are not intended to limit this application.

Before embodiments of this application are further described in detail, nouns and terms in embodiments of this application and their corresponding uses\effects\functions, and the like in this application are described. The nouns and terms in embodiments of this application are applicable to the following explanations.

Fine-grained image recognition (FGVC) means performing further distinguishing on a basic category. Currently, there are mainly the following two types of methods: (1) a method based on positioning of an important region in an image, where this method focuses on how to automatically find a distinguishing region in an image by using weakly monitored information to achieve an objective of fine classification; and (2) a method based on expression of a fine feature of an image, where this method proposes to perform high-order coding on image information by using a high-dimensional image feature (such as a bilinear vector), to achieve an objective of accurate classification.

A convolutional neural network (CNN) is a type of a feedforward neural network that includes convolutional calculation and has a deep structure, and is one of representative algorithms of deep learning. The convolutional neural network has a representation learning capability, and can perform shift-invariant classification on input information based on a hierarchical structure of the convolutional neural network. Therefore, the convolutional neural network is also referred to as a "shift-invariant artificial neural network (SIANN)". Commonly used convolutional neural networks include VGG, ResNet, Iception, Efficient Net, and the like.

Fine-grained recognition means performing further classification distinguishing on a basic classification category.

Generic category label and fine-grained classification label: The generic category label refers to a label with a basic classification, and the fine-grained classification label refers to a label of a further fine-grained classification in the basic classification (for ease of description, the fine-grained classification label is also referred to as a soft label in this application). For example, the generic category label may be a "vehicle", and the fine-grained classification label is further fine-grained classification of the "vehicle", such as a "vehicle brand".

Target dataset and target annotation type label: The target dataset is a training set or referred to as a sample set. The target annotation type label refers to a classification label of data in the target dataset, and the classification label includes a fine-grained classification label.

Domain migration means applying information obtained in one field to another field and generating a gain. For example, in this application, a dataset that used for fine-grained recognition and that is annotated by using a data annotation method is input into a classification model as a training set for training to obtain a model used for fine-grained recognition. An outer product is a matrix multiplication.

Information entropy: The information entropy is a concept used to measure an information amount in an information theory. Amore orderly system has less uncertainty and lower information entropy. On the contrary, a more chaotic system has greater uncertainty and higher information entropy. Specifically, in this application, because same data may be annotated with a plurality of different labels, the information entropy of a current data annotation of the data is calculated to determine stability of the current data annotation of the data. A value of the information entropy indicates a stability degree of the current data annotation of the data. A lower value of the information entropy indicates that an uncertainty degree of the annotation is low and that the data annotation of the data is relatively stable. In this case, it may be considered that stability of the data annotation is high. On the contrary, a larger value of the information entropy indicates that the current data annotation of the data has high uncertainty and that the annotation of the data is relatively chaotic. In this case, it may be considered that stability of the data annotation of the data is relatively low.

Overfitting: A hypothesis can better fit with training data than other hypothesizes, but cannot well fit with data in a dataset other than the training data. In this case, it is considered that an overfitting phenomenon occurs in this hypothesis. A main reason for occurrence of this phenomenon is that noise exists in the training data or that there is excessively small amount of training data.

With reference to the accompanying drawings, the following first analyzes the conventional technology, and then describes a data annotation method, a fine-grained recognition model training method based on the method, and a fine-grained recognition method based on a trained model in this application.

Analysis of the Conventional Technology

Conventional technology 1: FIG. 1 is a schematic diagram of a bilinear convolutional neural network applied to fine-grained image recognition in the conventional technology 1.

A basic idea of the method is to extract a higher-order feature by performing an outer product on feature graphs output by two classification models (for example, VGG16 convolutional neural networks). This higher-order feature is proved to be critical for fine-grained image classification, and has nearly 10% improvement on a dataset CUB-200-2011 based on the VGG16 convolutional neural network.

A working procedure of performing fine-grained image recognition based on the bilinear convolutional neural network is as follows.

In a first operation, a picture is input. Generally, an object image photographed by a camera is used as network input.

In a second operation, an image feature is extracted. Specifically, the image is separately input into two VGG16 convolutional neural networks for training, and a multi-channel feature of the image is extracted by using stacked operations such as convolution and pooling. An outer product is performed on the features extracted by the two VGG16 convolutional neural networks, to obtain a higher-order feature of the image.

In a third operation, classification is performed. Specifically, a dimension of the higher-order image feature obtained by the model is reduced by using a fully connected layer, and output of a softmax layer is used as a classification result.

The conventional technology 1 has the following disadvantages: A bilinear network model can mine high-order features of image information, and these high-order features can generate a great gain for a fine-grained classification task. However, because feature graphs output by two networks have a high dimension, a quantity of model parameters is greatly increased, and an extremely large quantity of computing resources are consumed to calculate the outer product. This is also one of large disadvantages of the bilinear model.

Figure 2:
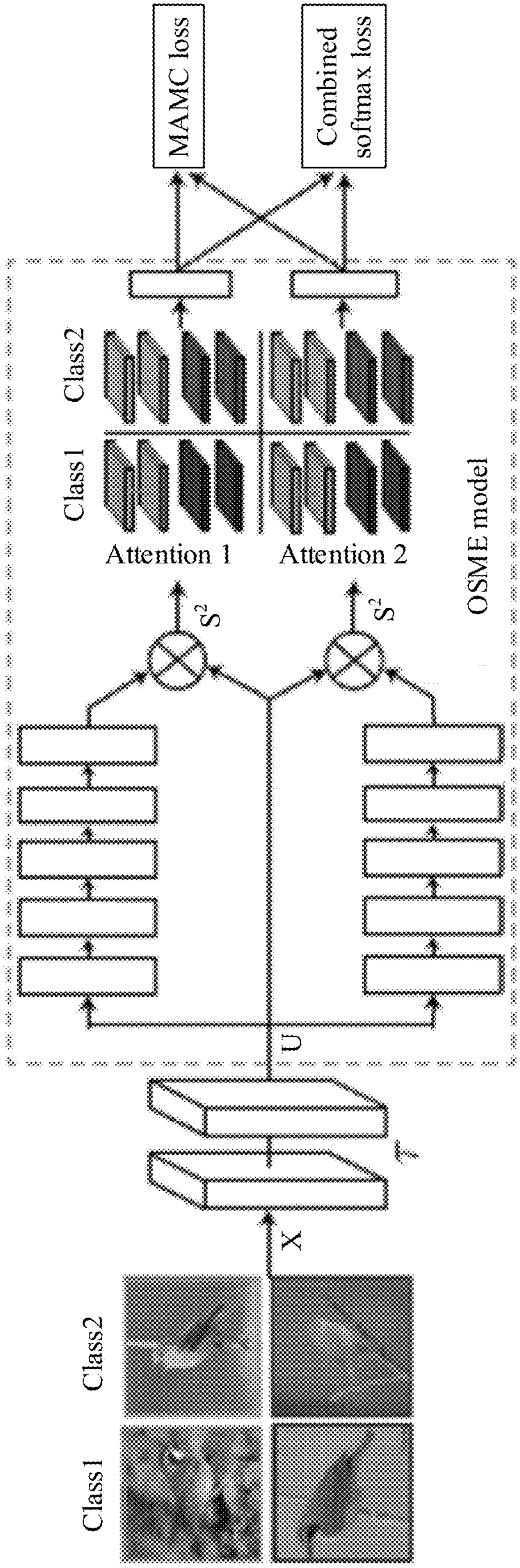
FIG. 2 is a schematic diagram of a neural network model based on an attention mechanism in a conventional technology 2.

Conventional technology 2: FIG. 2 is a schematic diagram of a classification model that has an attention mechanism and that is applied to fine-grained image recognition in the conventional technology 2. A solution in the conventional technology 2 is a method based on a visual attention mechanism, and the method is one of methods usually used in a fine-grained classification task. Generally, when recognizing different objects, human beings first observe distinguishing regions between the objects, to distinguish between different types. The visual attention mechanism is inspired by human vision. A network model gradually pays attention to a region with key distinguishing information, and then extracts a feature from the region and uses the feature for classification. Currently, a relatively representative model is shown in the schematic diagram of the classification model shown in FIG. 2.

Figure 3:
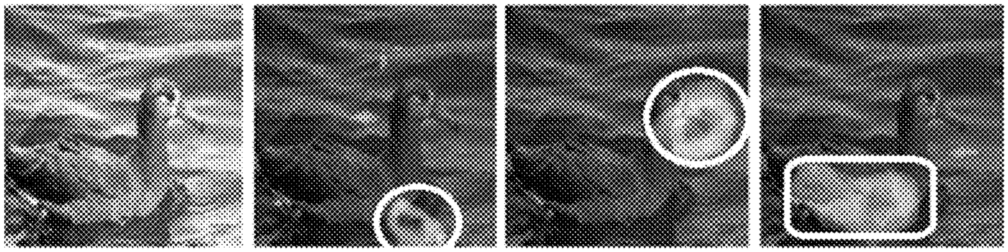
FIG. 3 is a schematic diagram of positioning a key region by using an attention mechanism in a conventional technology 2.

An obvious difference between the algorithm in the conventional technology 2 and a conventional tracking algorithm lies in that a visual attention mechanism module is added. First, a model extracts multi-channel information of an image through convolution and pooling, and then a key location in the image is positioned by using an attention mechanism module including a global average pooling layer and a fully connected layer. FIG. 3 shows a schematic diagram of positioning a key region by using an attention mechanism. A first picture in FIG. 3 represents a target image, and parts surrounded by frame lines in second, third, and fourth pictures represent different key regions. Then, features extracted from the plurality of key regions are compared and classified to obtain a category of the image.

The conventional technology 2 has the following disadvantages: Because it is difficult to annotate a fine-grained image dataset, a quantity of training samples is relatively small, and overfitting is extremely easily generated. In this case, the visual attention mechanism may be unable to fully mine a region with key information, but positions a noise part, which affects classification accuracy. In addition, designs of a visual attention module are different, there is also a problem of increasing model complexity, which is not applicable to a scenario, such as self-driving, in which a requirement for real-time quality is relatively high.

Figure 4:
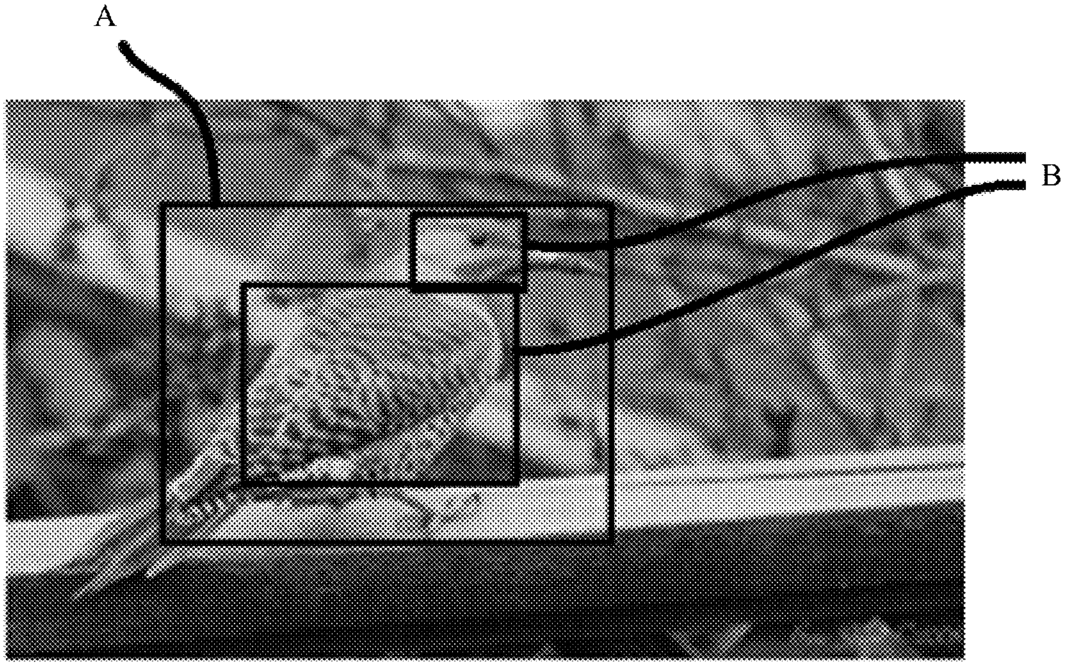
FIG. 4 is a schematic diagram of a method based on target block detection in a conventional technology 3.

Conventional technology 3: A method based on target block detection is used in a technical solution of the conventional technology 3. The method is also one of methods usually used in a fine-grained classification task. In this method, based on detection, a whole location of a target is first detected, and then a location of a key region is detected and information is extracted for classification. Different from the visual attention mechanism, annotation information of the key region is utilized. In this algorithm, the target and the key location are accurately positioned by using a two-dimensional detection method. As shown in FIG. 4, a two-dimensional frame A is a location at which a model detects a bird, that is, a whole location of a target, and two-dimensional frames B are separately a back location and a head location that are detected, that is, locations of key regions. Then, features are extracted from these target blocks and used as input of a classification layer to obtain final category information.

A Part-based R-CNN detects an object level (for example, a bird category) and a local region (a head, a body, or another part) of a fine-grained image by using the foregoing idea. In this algorithm, selective search is first used to search for a candidate frame in which a target is generated or a target may appear in the fine-grained image. Then, three detection models are trained by using a procedure similar to R-CNN target detection and by using target (object) annotation and part annotation in a fine-grained dataset, and respectively correspond to detection of a whole target, detection of a target head, and detection of a target back. Next, an obtained target block is used as input of a classification model, and features of the target and the part are extracted for final classification.

The conventional technology 3 has the following disadvantages: First, the method based on target block detection belongs to a detection method, and is not an annotation method. Model training may use annotation information in a two-dimensional frame. For a fine-grained classification task, it is relatively difficult for a common person to annotate a key location, and it is difficult to determine distinguishing locations without a professional background. In addition, detection accuracy of a model is an extremely important aspect. When a bottom-up region generation method is used, a large quantity of unrelated regions is generated. This affects a running speed of the algorithm to a large extent. If detection is inaccurate and noise or a background region is positioned, a great impact is made on final classification, resulting in inaccurate classification.

Based on the disadvantages existing in the conventional technologies (for example, because classification is finer, it is difficult for a non-expert to distinguish between target types, and manual annotation costs are high due to the difficulty in data annotation, so that a quantity of annotated data samples is excessively small; and when a fine-grained image recognition model is trained, a trained model is overfitted during image recognition because the quantity of annotated data samples is small, which further causes low recognition accuracy), this application provides a data annotation method. A technology for migrating a domain of a generic category label is used to enhance performance of a fine-grained recognition task by using the generic category label with low annotation costs. In addition, a progressive iterative and coordinated training mechanism is proposed. A fine-grained classification label is generated for a large quantity of datasets with the generic category label by using the mechanism, and an overfitting problem in fine-grained recognition is effectively mitigated by introducing a large amount of automatically annotated data, thereby improving recognition performance. The following describes this application.

First Embodiment of the Data Annotation Method in this Application

Figure 5A:
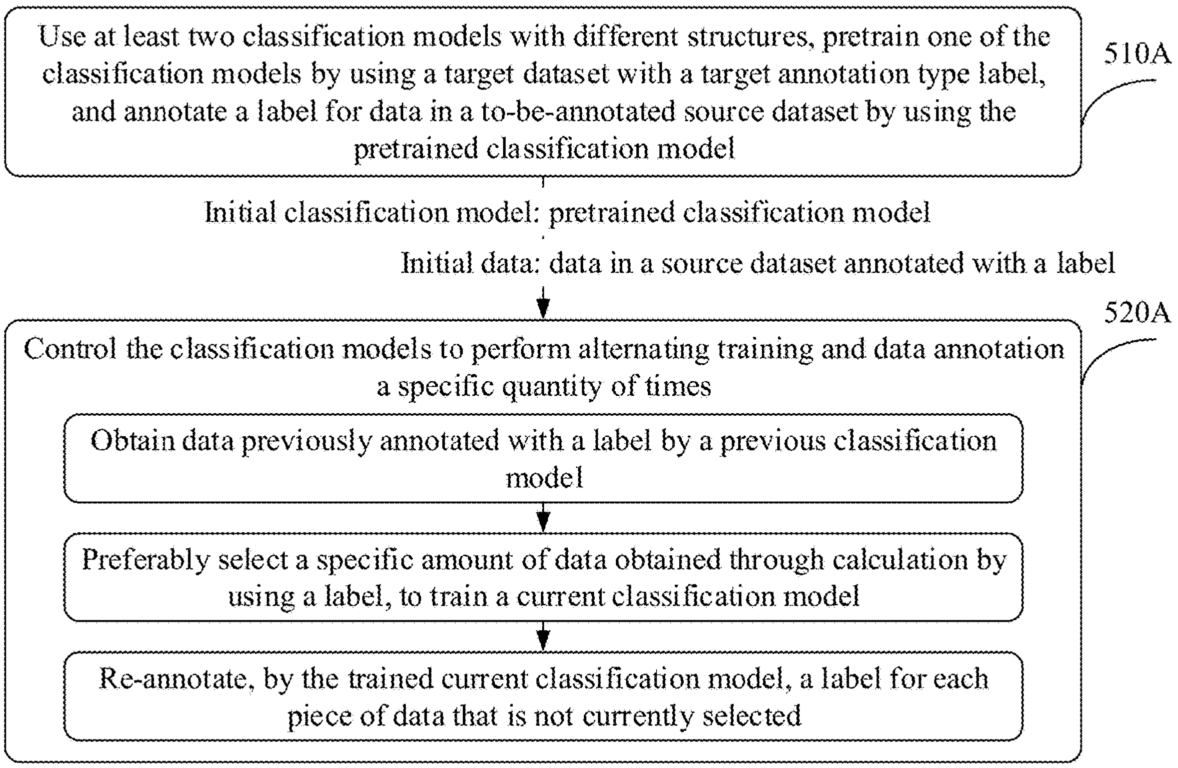
FIG. 5A is a flowchart of a first embodiment of a data annotation method according to this application.

The following describes the first embodiment of the data annotation method in this application with reference to a flowchart shown in FIG. 5A. The method includes the following operations.

S510A: Use at least two classification models with different structures, pretrain one of the classification models by using a target dataset with a target annotation type label, and annotate a label for data in a to-be-annotated source dataset by using the pretrained classification model. This operation may, in some embodiments, be implemented by using a manner described in S610 to S611 in FIG. 6. The source data and target data may have a label (that is, a generic category label) of a same basic classification, and the target data has the target annotation type label, that is, the target data has a label of a further fine-grained classification in the basic classification.

In the first embodiment and the following embodiments of this application, the classification model may be a model that can be for data label annotation (that is, classification), such as a multi-layer neural network (MLP), a recurrent neural network (RNN), or a convolutional neural network (CNN); or may be a decision tree, an integrated tree model, a Bayes classifier, or the like. For the classification models used in this application, classification models with different model structures may be preferably used, to avoid homogeneity of labels of self-annotated data. For example, one classification model uses the RNN and the other classification model uses the CNN. For another example, each of the classification models uses the CNN, where one classification model is an Efficient Net model and the other classification model is a ResNet model. For another example, models may be made different by making quantities of times of overlapping between convolutional layers and pooling layers that are respectively of the classification models to be different, or making pooling manners of the pooling layers to be different (for example, one pooling layer uses an average pooling manner, and the other pooling layer uses a max pooling manner).

One of the classification models is trained by using the target dataset with the target annotation type label. The target annotation type label herein may be the label of the further fine-grained classification in the basic classification, and annotated data with a fine-grained classification label is used as a training set to implement that the trained classification model can be used for annotating the fine-grained classification label. In addition, the classification model is pretrained, so that the pretrained model can have higher performance, and can have a faster speed in subsequent training.

S520A: Control the classification models to perform alternating training and data annotation for source data a quantity of times, where the pretrained classification model and data annotated with a label by using the pretrained classification model are used as an initial classification model and initial data annotated with a label in the alternating training and data annotation.

In the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected. This operation may, in some embodiments, be implemented by using a manner described in the operations S612 to S618 in FIG. 6.

This operation is further described in an embodiment. This operation is used to implement alternating training and alternating annotation of each classification model, to implement progressive label annotation. In the first embodiment and the following embodiments of this application, when there are two classification models, the two classification models run alternately. When there are more than two classification models, the classification models may alternately run regularly according to a rule to implement the alternating training in this application and alternately generate a label, for example, may run sequentially and form a cycle (for example, a CNN 1—a CNN 2—a CNN 3—a CNN 1), or may run sequentially in a round-trip manner (the CNN 1—the CNN 2—the CNN 3—the CNN 2—the CNN 1), or may alternately run irregularly. In the progressive iterative and coordinated training mechanism, overfitting in an annotation process can be effectively reduced by introducing a large amount of automatically annotated data in an iteration process. In particular, when the progressive iterative and coordinated training mechanism is used to annotate a fine-grained classification label for a large quantity of datasets with a generic category label, overfitting in fine-grained recognition can be effectively reduced, thereby improving recognition performance. A quantity of times of alternating training and data annotation may be flexibly set, and the quantity of times may be an empirical value, which does not affect training on an effect of the current classification model, and does not cause an excessively large quantity of iterations.

In the first embodiment and the following embodiments of this application, when a part of data is selected to train the current classification model, the part of data may be selected based on stability of an annotation of each piece of data. Stability may be measured by using information entropy, and an amount of data previously annotated with a label is selected based on an entropy value of the information entropy. In some embodiments, stability of a data annotation of each piece of data may be determined with reference to another manner, for example, data in the source dataset is clustered, and a label that can express label importance of a class group in which the data is located is enabled to have a data annotation with relatively high stability.

When the stability is measured by using information entropy, the selecting a part of data includes: calculating information entropy of a data annotation of each piece of data based on each label annotated on the data, and selecting the data based on an order of values of the information entropy, where the value of the information entropy is inversely proportional to stability of the data annotation.

A formula for calculating the information entropy may be as follows:

$$H(x) = -\sum_{i=1}^{n} p(x_i)\log(p(x_i)) \quad (1)$$

where x represents current data, xi represents an $i^{th}$ label of the current data, p(xi) represents a probability that the current data x belongs to the $i^{th}$ label, n represents a total quantity of labels annotated for the current data, and H(x) represents a degree of uncertainty of a data annotation of the current data. A smaller value of H(x) indicates a higher degree of stability of the data annotation of the current data. On the contrary, a larger value of H(x) indicates a lower degree of stability of the data annotation of the current data.

After the values of the information entropy are sorted in ascending order, an amount of selected data may be a value, for example, the first 100 pieces of data, or may be a proportion, for example, an amount of data in source data/N, where N is set based on experience, and a value of N≥(a quantity of classification models with different structures used in a data annotation process+1). For example, when the quantity of classification models with different structures used in the data annotation process is 2, N may be 3 or a value that is greater than 3 and that is set based on experience.

In some embodiments, data may be selected by setting a threshold for the value of the information entropy, for example, data whose amount is less than a specified threshold is selected.

A value of the amount of selected data is a balanced value, which does not affect training on an effect of the current classification model, and does not cause an excessively large quantity of iterations.

Second Embodiment of the Data Annotation Method in this Application

Figure 5B:
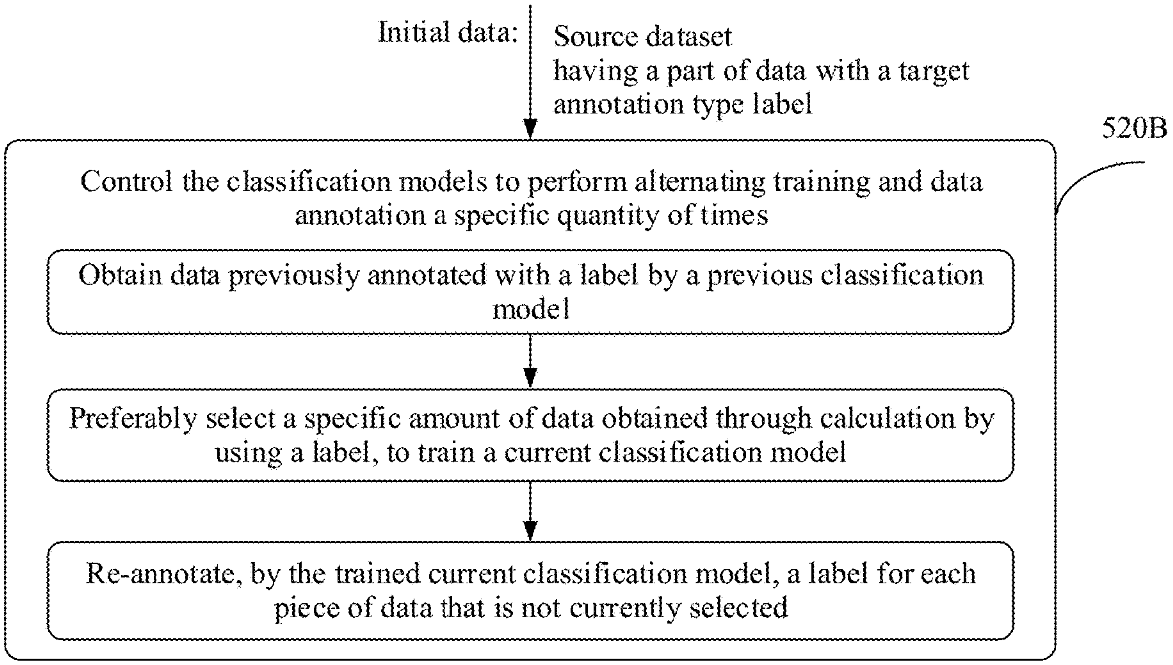
FIG. 5B is a flowchart of a second embodiment of a data annotation method according to this application.

The following describes the second embodiment of the data annotation method in this application with reference to a flowchart shown in FIG. 5B. The method includes the following operation.

S520B: Use at least two classification models with different structures, and control the classification models to perform alternating training and data annotation a quantity of times, where in the alternating training and data annotation, in data used for training an initial classification model (which is equivalent to the source dataset the first embodiment), all data has a label of a same basic classification (that is, a generic category label), and a part of data has a target annotation type label (that is, a label of a fine-grained classification).

For operations of current training and current data annotation that are performed by the currently trained classification model in the alternating training and data annotation process, refer to the descriptions in the first embodiment. Details are not described again.

When the source dataset has a part of data with the target annotation type label, and alternating training is performed in the foregoing manner, the part of data with the target annotation type label is selected preferably (that is, selected based on stability of an annotation of each piece of data) in the initial or first several times of alternating training to train a corresponding classification model.

In addition, one of the classification models may be pretrained by a target dataset with the target annotation type label. When some target datasets with the target annotation type label are selected to pretrain the classification model, the classification model is pretrained, so that the pretrained model can have higher performance, and can have a faster speed in subsequent training.

This operation can also be used to implement alternating training and alternating annotation of each classification model, to implement progressive label annotation.

The selection is performed based on stability of an annotation of each piece of data. For details, refer to the descriptions in the first embodiment of the data annotation method. Details are not described again.

[First Embodiment of the Data Annotation Method in this Application]

Figure 6:
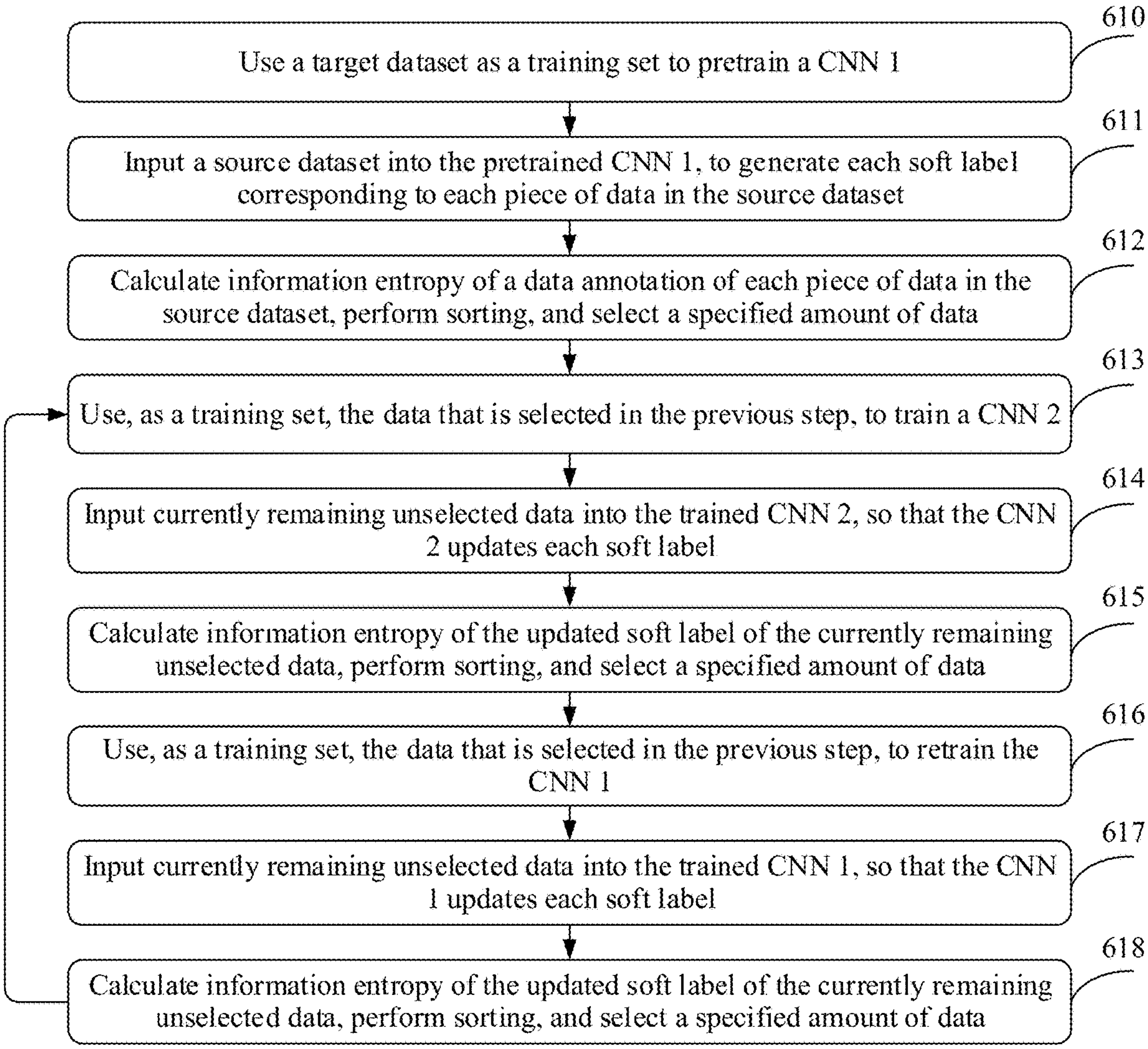
FIG. 6 is a flowchart of a first embodiment corresponding to a first embodiment of a data annotation method according to this application.

The following describes, with reference to a flowchart shown in FIG. 6, the first embodiment of the data annotation method provided in this application, and the method includes the following operations.

S610: First, select a convolutional neural network (or referred to as a classification model), which is referred to as a first convolutional neural network for ease of description and is referred to as a CNN 1 for short in the following; and input a target dataset into the CNN 1 as a training set to pretrain the CNN 1.

Specifically, the selected convolutional neural network (CNN) includes a convolutional layer and a pooling layer that can be used to extract a feature, and further includes a fully connected layer and a classifier layer that are used to train classification. The convolutional layer and the pooling layer may be connected in an overlapping manner, an input end of the fully connected layer is connected to an output end of the pooling layer, and an output end of the fully connected layer is connected to the classifier layer. After the CNN 1 is selected, a target dataset used to pretrain the CNN 1 may further be constructed. In this embodiment, the target dataset is an image sample set. It should be noted that, considering that the CNN has different recognition tasks, the constructed image sample set should match a recognition task of the CNN. For example, when the CNN 1 is used to recognize each feature of a vehicle and annotate a label for a vehicle picture, the image sample set should include a large quantity of different images of the vehicle. When the CNN 1 is used to recognize a traffic sign image, the image sample set should include different traffic sign images. In other words, when the CNN 1 is used to recognize an article, the image sample set should include an image including an image of the article. In addition, these images may be obtained in a plurality of manners, for example, image information with a standard annotation is directly obtained by using a database or a network channel, or the image information may be directly photographed or collected by using a photographing terminal or a collection device. Certainly, after the image information is obtained, a classification annotation corresponding to the image information is obtained through manual annotation and intelligent annotation, to form an image sample set that can be used to pretrain the CNN 1.

An advantage of pretraining is that a pretrained model has higher performance, and a training speed is larger in a subsequent training process. When the target dataset includes more types of pictures, the pretrained CNN 1 can support recognition of more types of pictures when subsequently recognizing a to-be-recognized picture. Therefore, the target dataset is an annotated dataset that has a finer classification annotation in addition to a generic classification (for ease of description, the finer classification annotation is also referred to as a soft label in this application). Generally, a relatively small amount of data may be used in the target dataset. For example, in test data shown in subsequent experimental data and effect in this specification, less than one million picture samples are used in the target dataset (that is, the training set).

S611: Input a source dataset into the pretrained CNN 1, to generate each soft label corresponding to each piece of data in the source dataset.

The source dataset in this embodiment is a dataset with a generic category label of a basic category, and does not have a finer classification annotation. A relatively large amount of data may be used in the source dataset. For each piece of data in the source dataset, image information may be directly obtained by using a network channel, or may be directly photographed or collected by using a photographing terminal or a collection device.

The trained CNN 1 has a capability of annotating a soft label for source data. Therefore, when each piece of data in the source dataset is input into the pretrained CNN 1, the CNN 1 generates a soft label for the data in the source dataset.

In addition, each piece of data in the source data may not have a generic category label, and instead, the CNN 1 generates a generic category label when generating a soft label for the source dataset. However, each piece of data in the source data may belong to a same basic category as data in the target dataset.

S612: Calculate information entropy of a data annotation of each piece of data in the source dataset based on information about the soft label of the data in the previous operation, sort entropy values of the information entropy in ascending order, and select, based on the sorting order, a specified amount of data annotated with each soft label from the front to the back.

The specified amount may be (an amount of data in the source data)/N, where N is set based on experience, and a value of N≥(a quantity of convolutional neural networks with different structures used in a data annotation process+1).

A formula for calculating the information entropy is as follows:

$$H(x) = -\sum_{i=1}^{n} p(x_i)\log(p(x_i)) \quad (1)$$

where x represents current data, xi represents an $i^{th}$ label of the current data, p(xi) represents a probability that the current data x belongs to the $i^{th}$ label, n represents a total quantity of labels annotated for the current data, and H(x) represents a degree of uncertainty of a data annotation of the current data. A smaller value of H(x) indicates a higher degree of stability of the data annotation of the current data. On the contrary, a larger value of H(x) indicates a lower degree of stability of the data annotation of the current data.

The following further describes a manner of obtaining the probability p(xi) that the data x belongs to the $i^{th}$ label. One piece of data in the source dataset in operation S611 is used as an example for description. In operation S611, when the data is input into the pretrained CNN 1, the CNN 1 generates, at an output layer (the softmax layer shown in FIG. 1) of the CNN 1, a probability corresponding to each soft label, that is, p(xi).

In addition, another manner may be combined with. For example, the data in the source dataset is clustered, and a label that can express label importance of a class group in which the data is located is enabled to have a data annotation with relatively high stability.

S613: Select a second convolutional neural network (or referred to as a classification model), which is referred to as a CNN 2 in the following; and input, into the CNN 2 as a training set, the data that is annotated with each soft label and that is selected in the previous operation, to train the CNN 2.

In some embodiments, the CNN 2 and the CNN 1 are CNNs of different models, to avoid homogeneity of labels of self-annotated data. For example, when the CNN 1 uses Efficient Net, the CNN 2 may use ResNet or another model. For another example, when each of the CNN 2 and the CNN 1 uses the Efficient Net, models may be made different by making quantities of times of overlapping between convolutional layers and pooling layers that are respectively of the CNN 2 and the CNN 1 to be different, or making pooling manners of the pooling layers to be different (for example, one pooling layer uses an average pooling manner, and the other pooling layer uses a max pooling manner).

S614: Input currently remaining unselected data into the CNN 2 trained in the previous operation, so that the CNN 2 updates the soft label for each piece of currently remaining unselected data.

The updating the soft label herein means updating/replacing the soft label with a latest classification annotation. The updated soft label also includes a probability corresponding to each soft label.

S615: Calculate information entropy of the updated soft label of remaining unselected data in the previous operation, sort the information entropy in ascending order, and select a specified amount of data annotated with each soft label from the front to the back.

For details of this operation, refer to S612. Details are not described again.

S616: Input, into the CNN 1 as a training set for training, the data that is annotated with each soft label and that is selected in the previous operation, to retrain the CNN 1.

S617: Input currently remaining unselected data into the CNN 1 retrained in the previous operation, to update the soft label for each piece of currently remaining unselected data.

For this operation, refer to S614. Details are not described again.

S618: Calculate information entropy of the updated soft label of the currently remaining unselected data, sort the information entropy in ascending order, select a specified amount of data annotated with each soft label from the front to the back, and go back to execution of S613.

It should be noted that, in a process of executing the foregoing operations, for example, in a process in S615 and S618 in which sorting is performed and a specified amount of data annotated with each soft label is selected, when no specified amount can be selected, it indicates that each piece of data in the source dataset is annotated with the soft label, and there is no data without the soft label. In this case, this procedure may end.

[Second Embodiment of the Data Annotation Method in this Application]

Figure 7:
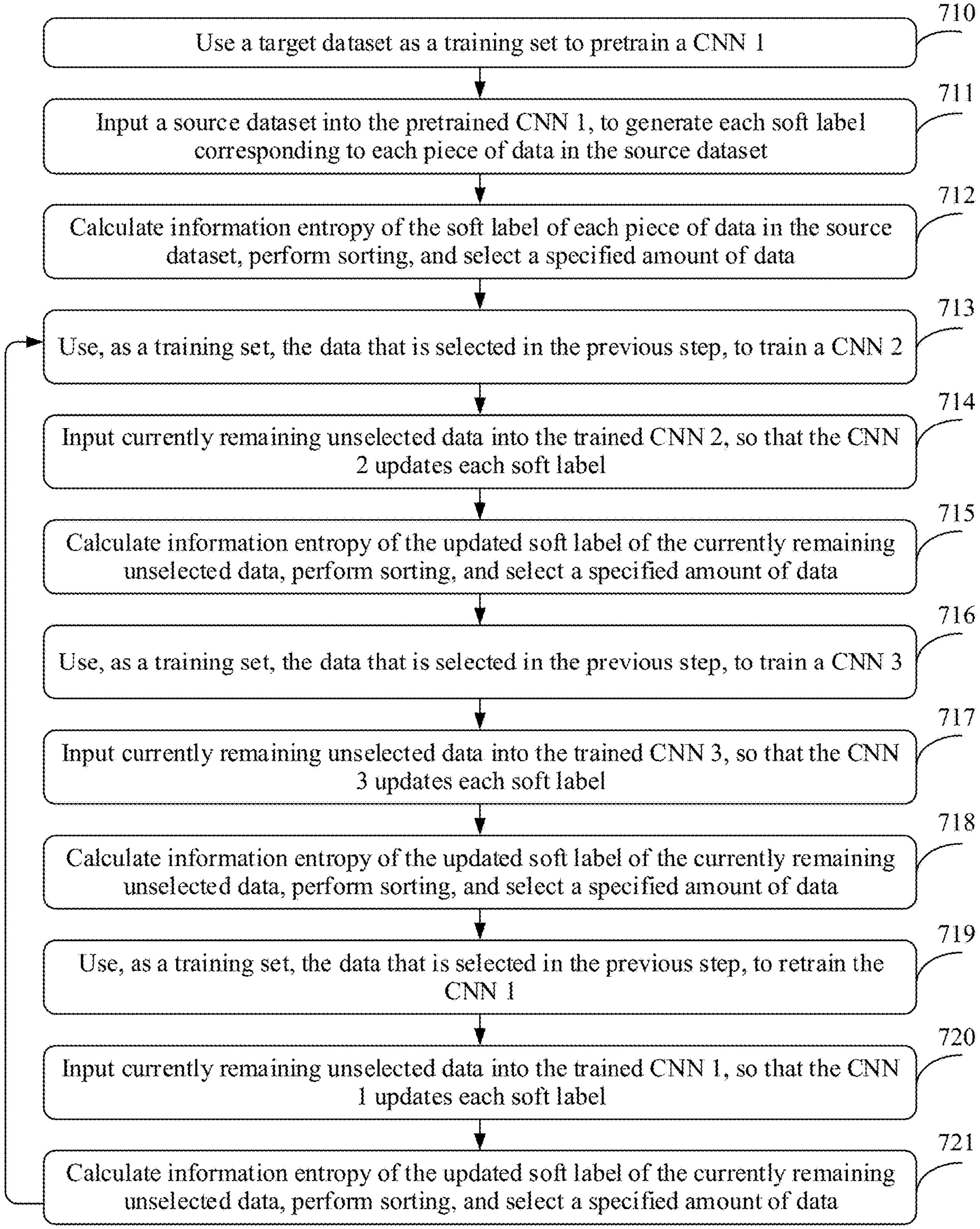
FIG. 7 is a flowchart of a second embodiment corresponding to a first embodiment of a data annotation method according to this application.

The method in this application is described in the first embodiment by using two CNNs as examples. A plurality of different CNNs may be disposed to implement this application. The following uses three CNNs as examples for description. For simplification, differences are mainly described. For detailed operations in the following operations, refer to the first embodiment of the data annotation method. Referring to a flowchart shown in FIG. 7, when three CNNs are used, the data annotation method includes the following operations.

S710 to S715 are the same as corresponding operations S610 to S615.

S716: Input, into a third convolutional neural network (which is referred to as a CNN 3 for short in the following) as a training set, the data that is annotated with each soft label and that is selected in the previous operation, to train the CNN 3.

S717: Input currently remaining unselected data into the CNN 3 trained in the previous operation, to update the soft label for each piece of currently remaining unselected data.

S718: Calculate information entropy of the updated soft label of the currently remaining unselected data, sort the information entropy in ascending order, select a specified amount of data annotated with each soft label from the front to the back, and execute a next operation.

S719 to S721 are the same as corresponding operations S616 to S618.

It should be noted that, in a process of executing the foregoing operations, for example, in a process in S715, S718, and S721 in which sorting is performed and a specified amount of data annotated with each soft label is selected, when no specified amount can be selected, it indicates that each piece of data in the source dataset is annotated with the soft label. In this case, this procedure may end.

As described above, when S713 to S715 are used as a group of processing of the CNN 2, S716 to S718 are used as a group of processing of the CNN 3, and S719 to S721 are used as a group of processing of the CNN 1, it may be learned that in the second embodiment of the data annotation method, the three CNNs sequentially and alternately run and form a cyclic manner to implement the data annotation processing, that is, an order of the CNN 2—the CNN 3—the CNN 1—the CNN 2. Actually, there is no specific requirement for an execution order. For example, after execution of the CNN 1, the CNNs may alternately run in a reversed sequence, for example, an order of the CNN 2—the CNN 3—the CNN 1—the CNN 3—the CNN 2.

Corresponding to the data annotation method in this application, this application further correspondingly provides a data annotation apparatus. For an example of a function and a use of each module included in the apparatus and a beneficial effect, refer to embodiments of the data annotation method. Therefore, details are not described during description of the apparatus.

First Embodiment of the Data Annotation Apparatus in this Application

Figure 8A:
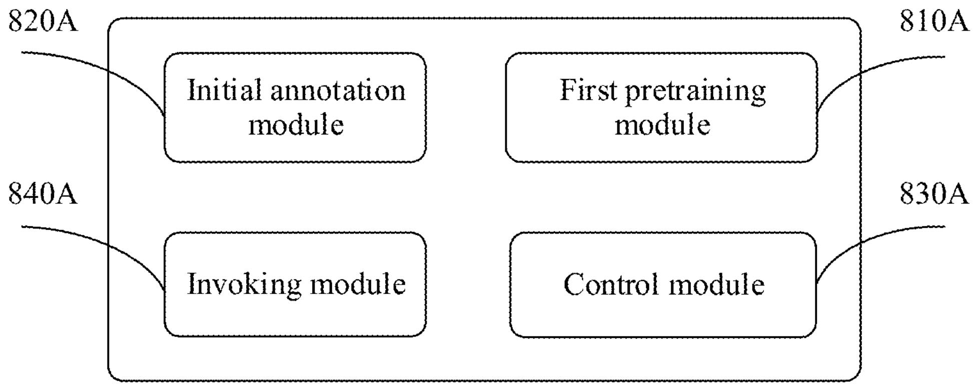
FIG. 8A is a schematic diagram of a first embodiment of a data annotation apparatus according to this application.

Referring to a schematic diagram of an apparatus shown in FIG. 8A, the data annotation apparatus in this application in the first embodiment includes:

an invoking module 840A, configured to invoke at least two classification models with different structures;

a first pretraining module 810A, configured to pretrain one of the classification models by using a target dataset with a target annotation type label, where the target annotation type label includes a label with a fine-grained classification in a basic classification;

an initial annotation module 820A, configured to annotate a label for data in a to-be-annotated source dataset by using the pretrained classification model; and a control module 830A, configured to control the classification models to perform alternating training and data annotation a quantity of times, where the pretrained classification model and data annotated with a label by using the pretrained classification model are used as an initial classification model and initial data annotated with a label in the alternating training and data annotation; and in the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

The selection is performed based on stability of an annotation of each piece of data.

When the stability is measured by using information entropy, the selecting a part of data includes: calculating information entropy of a data annotation of each piece of data based on each label annotated on the data, and selecting the data based on an order of values of the information entropy, where the value of the information entropy is inversely proportional to stability of the data annotation.

The source data and target data may have a label of a same basic classification, and the target data further includes the target annotation type label, and the target annotation type label is a label of a further fine-grained classification in the basic classification.

Second Embodiment of the Data Annotation Apparatus in this Application

Figure 8B:
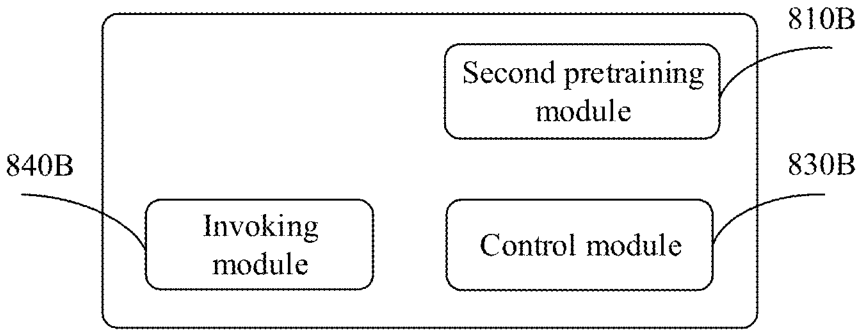
FIG. 8B is a schematic diagram of a second embodiment of a data annotation apparatus according to this application.

Referring to a schematic diagram of an apparatus shown in FIG. 8B, the data annotation apparatus in this application in the second embodiment includes:

an invoking module 840B, configured to invoke at least two classification models with different structures; and a control module 830B, configured to control the classification models to perform alternating training and data annotation a quantity of times, where in the alternating training and data annotation, a part of data used for training an initial classification model has a target annotation type label.

In the alternating training and data annotation process, operations of current training and current data annotation that are performed by a currently trained classification model include: obtaining data that is re-annotated with a label by a previously trained classification model, selecting a part of data from the data to train the current classification model, and re-annotating, by the trained current classification model, a label for the other part of data that is not selected.

The apparatus further includes a second pretraining module 810B, configured to pretrain the initial classification model by using a target dataset of annotated data with the target annotation type label.

The selection is performed based on stability of an annotation of each piece of data.

The performing the selection based on stability that is of an annotation of each piece of data and that is obtained through calculation by using a label includes: calculating information entropy of a data annotation of each piece of data based on each label annotated on the data, and selecting, based on an order of entropy values of the information entropy, a part of the data that is re-annotated with a label by using the previously trained classification model, where the value of the information entropy is inversely proportional to stability of the data annotation.

The data used by the initial classification model has a label of a same basic classification, and the target annotation type label is a label of a further fine-grained classification in the basic classification.

Figure 9A:
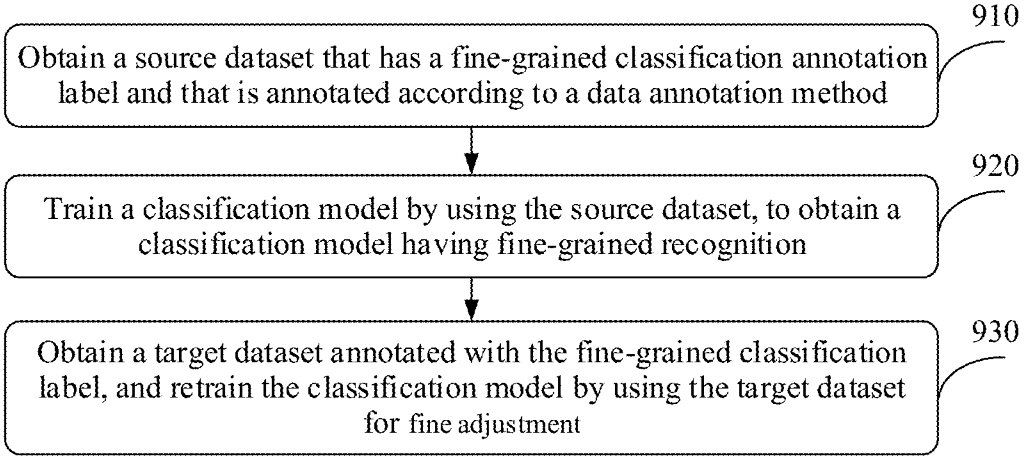
FIG. 9A is a flowchart of an embodiment of a fine-grained recognition model training method according to this application.

An Embodiment of a Fine-Grained Recognition Model Training Method in this Application Referring to a flowchart shown in FIG. 9A, the fine-grained recognition model training method in this embodiment of this application includes the following operations.

S910: Obtain a source dataset that has a fine-grained classification label and that is annotated according to the foregoing data annotation method.

When this operation is implemented, details may be as follows: A source dataset and a target dataset annotated with the fine-grained classification label are first obtained, and then data annotation is performed on the source dataset according to the foregoing data annotation method, to generate the source dataset with the fine-grained classification label.

S920: Train a classification model by using the source dataset annotated with the fine-grained classification label, to obtain a trained classification model that can be used for fine-grained recognition.

To improve model precision, S930 is further added, and this operation includes: obtaining the target dataset annotated with the fine-grained classification label, and retraining the classification model by using the target dataset, to fine adjust the classification model.

Figure 9B:
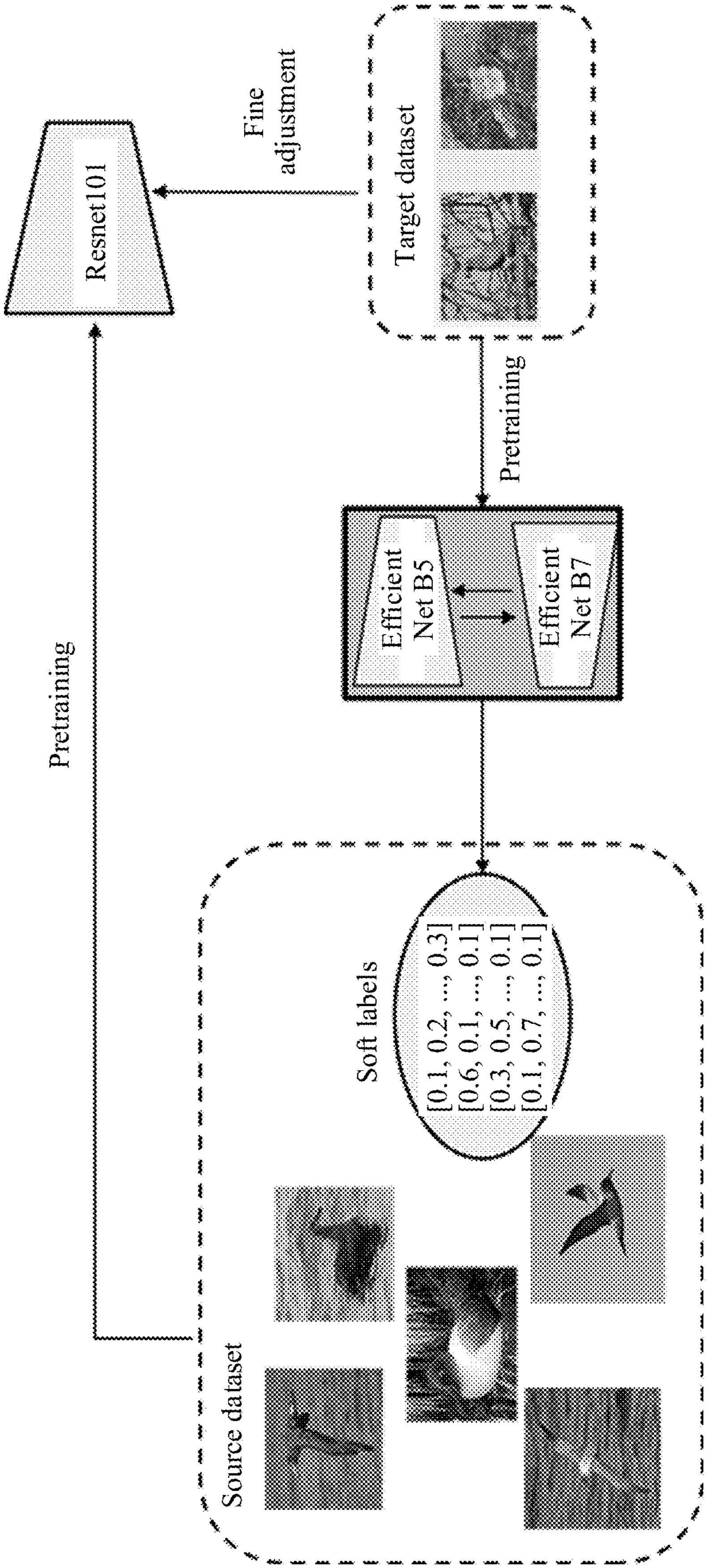
FIG. 9B is a flowchart of an embodiment of a fine-grained recognition model training method according to this application.

The embodiment of the fine-grained recognition model training method shown in FIG. 9B includes a process of annotating a soft label (fine-grained classification label) for source data, training of a fine-grained recognition model by using annotated data, and a whole procedure for further continuing to perform fine adjustment by using the target dataset. Specifically, as shown in FIG. 9B, at least two classification models with different structures are used: a convolutional neural network Efficient Net B5 and a convolutional neural network Efficient Net B7. One of the two classification models is pretrained by using the target dataset with a target annotation type label, and the pretrained classification model annotates a label for data in the to-be-annotated source dataset. In addition, the Efficient Net B5 and the Efficient Net B7 are alternately trained by using the foregoing data annotation method in this application, and in the training process, the soft label is annotated for the data in the source dataset. Further, corresponding to operation S920, another classification model, such as a ResNet 101 in FIG. 9B, is trained by using the source dataset annotated with the soft label, to obtain a trained classification model ResNet 101 that can be used for fine-grained recognition. Moreover, corresponding to operation S930, the trained classification model ResNet 101 having fine-grained recognition is fine adjusted by using the target dataset.

Figure 10:
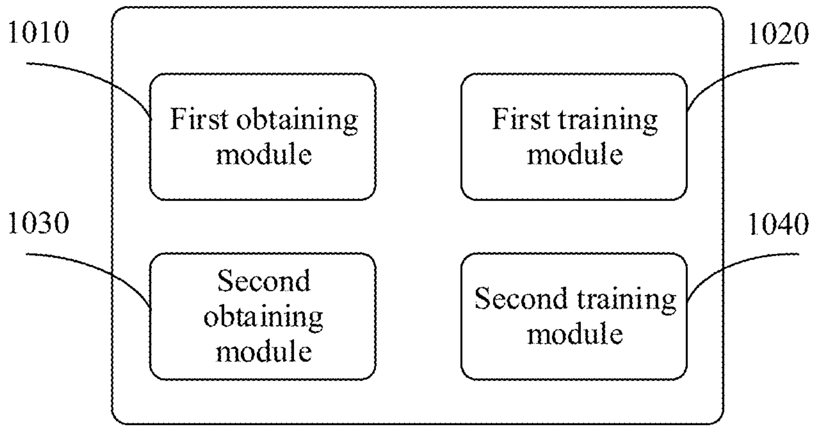
FIG. 10 is a schematic diagram of an embodiment of a fine-grained recognition model training apparatus according to this application.

An Embodiment of a Fine-Grained Recognition Model Training Apparatus in this Application Referring to a schematic diagram of an apparatus shown in FIG. 10, the fine-grained recognition model training apparatus in this embodiment of this application includes:

- a first obtaining module 1010, configured to obtain a source dataset that has a fine-grained classification label and that is annotated according to the foregoing data annotation method; and
- a first training module 1020, configured to train a classification model by using the source dataset annotated with the fine-grained classification label, to obtain a trained classification model that can be used for fine-grained recognition.

Further, to improve model precision, the apparatus further includes:

- a second obtaining module 1030, configured to obtain a target dataset annotated with the fine-grained classification label; and
- a second training module 1040, configured to retrain the classification model by using the target dataset.

Another Embodiment of a Fine-Grained Recognition Model Training Method in this Application A difference between the fine-grained recognition model training method in this embodiment and that in FIG. 9A lies in operation S910. Operation S910 may be replaced with the following:

- obtaining a source dataset and a target dataset with a fine-grained classification label; and annotating the source dataset according to the foregoing data annotation method by using the target dataset, to obtain a source dataset with the fine-grained classification label.

Another Embodiment of a Fine-Grained Recognition Model Training Apparatus in this Application A difference between the fine-grained recognition model training apparatus in this embodiment and that in FIG. 10 lies in that a function of the first obtaining module 1010 may be replaced with: obtaining a source dataset and a target dataset with a fine-grained classification label, and annotating the source dataset according to the foregoing data annotation method by using the target dataset, to obtain a source dataset with the fine-grained classification label.

Embodiment of a Fine-Grained Recognition Method in this Application

Figure 11:
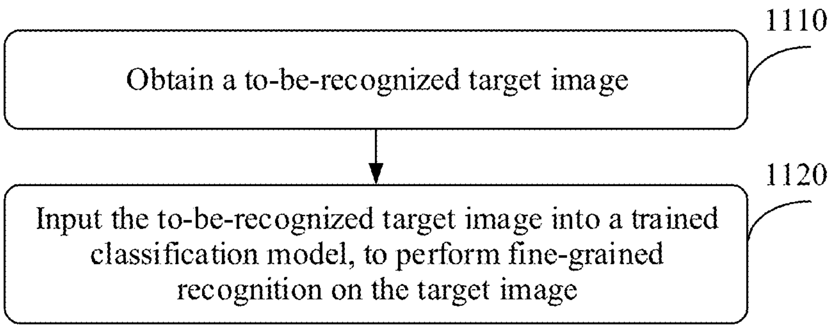
FIG. 11 is a flowchart of an embodiment of a fine-grained recognition method according to this application.

Referring to a flowchart of a fine-grained recognition method shown in FIG. 11, an embodiment of the fine-grained recognition method in this application includes:

- S1110: Obtain a to-be-recognized target image.
- S1120: Input the to-be-recognized target image into the foregoing trained classification model, for example, the ResNet 101 in FIG. 9B, to perform fine-grained recognition on the target image by using the classification model.

Embodiment of a Fine-Grained Recognition Apparatus in this Application

Figure 12:
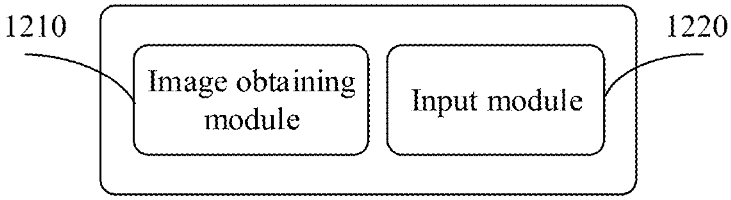
FIG. 12 is a schematic diagram of an embodiment of a fine-grained recognition apparatus according to this application.

Referring to a schematic diagram shown in FIG. 12, an embodiment of the fine-grained recognition apparatus in this application includes:

- an image obtaining module 1210, configured to obtain a to-be-recognized target image; and
- an input module 1220, configured to input the to-be-recognized target image into the foregoing trained classification model, for example, the ResNet 101 in FIG. 9B, to perform fine-grained recognition on the target image by using the classification model.

With reference to an example application scenario, the following describes application of the data annotation method and apparatus, the fine-grained recognition model training method and apparatus, and the fine-grained recognition method in this application. For example, details are provided below.

Application Scenario 1: Vehicle Recognition

This application scenario is target recognition of a self-driving system of a vehicle. Self-driving is currently a popular research direction. With the development of the economy, a quantity of vehicles in the world is increasing, which leads to an increase in traffic congestion, parking difficulties, difficulties in taking a taxi, and traffic accidents. Therefore, to resolve the foregoing problems, self-driving emerges.

The self-driving system includes six parts: video reading, target detection, target tracking, visual ranging, multi-sensor merging, and planning and control. This application is mainly used in a target detection phase to perform fine-grained recognition on a target detected by a target detection model. Vehicle detection usually exists in a self-driving behavior, including 2D detection and 3D detection. Fine-grained recognition on a vehicle helps regression of a 2D frame or a 3D frame, thereby improving vehicle detection accuracy. However, for an existing fine-grained recognition model, due to a lack of a sample with a fine-grained annotation in a training set during model training, overfitting occurs when a trained fine-grained recognition model performs recognition, which affects recognition precision. In addition, after data used for training is collected, a large amount of data annotation may be performed. If all the data is manually annotated, costs are high. This is extremely difficult for 3D annotation. The data annotation method and apparatus technology provided in this application can generate annotation information for data, thereby reducing manual annotation costs and reducing an annotation error rate. In addition, an annotated sample with a fine-grained annotation is used as a training set to train a classification model, to obtain a fine-grained recognition model that has a better classification effect. Further, if a to-be-recognized image is input into the model, fine-grained recognition may be performed on the image.

Specifically, for example, when fine-grained recognition is to be performed on a vehicle, where the fine-grained recognition is, for example, recognition of a vehicle logo and recognition of information about a vehicle manufacturer, a style, a production age, and the like. The foregoing fine-grained recognition may be simultaneous recognition. For ease of description, in this embodiment, only vehicle logo recognition is used as an example. When a vehicle logo of a vehicle is to be recognized, a classification model (such as the ResNet 101 in FIG. 9B) that can be used for fine-grained recognition of a vehicle logo may be used. Generally, the classification model may be trained by using a large amount of data annotated with the vehicle logo as a training set (such as the source dataset in FIG. 9B). However, when the source dataset includes a large amount of data whose label annotation is "vehicle", and there is no plenty of data whose label annotation is "vehicle logo", the method in this application may be used to use a small quantity of target datasets with an annotation "vehicle logo" to annotate a vehicle logo label for a large amount of data in the source dataset, and then train the classification model by using the annotated source dataset. In addition, the classification model may be further fine adjusted by using the target dataset.

The following describes the data annotation method in this application with reference to the application scenario and an embodiment shown in FIG. 6, and the method includes the following operations.

In a first operation, first, a convolutional neural network CNN 1 (such as the Efficient Net B5 in FIG. 9B) and a convolutional neural network CNN 2 (such as the Efficient Net B7 in FIG. 9B) are selected. A target dataset (such as the target dataset in FIG. 9B) including data annotated with a vehicle logo label is selected, and a relatively small amount of data may be used in the target dataset. A to-be-annotated source dataset (such as the source dataset in FIG. 9B) is selected. Data in the source dataset has a label (such as "vehicle") of a same basic classification, and a relatively large amount of data may be used in the source dataset.

In a second operation, the target dataset is input into the CNN 1 as a training set to pretrain the CNN 1, and the source dataset is annotated for the first time by using a trained CNN 1. For details, refer to the operations S610 and S611.

In a third operation, the source dataset, the CNN 2, and the CNN 1 are used to implement iterative training of the CNN 1 and the CNN 2 and iterative update of an annotation of source data, so as to annotate the vehicle logo label for each piece of data in the source dataset. For details, refer to the operations S612 to S618. Details are not described again.

In a fourth operation, after the foregoing source data annotated the vehicle logo label is obtained, the source data is used as a training set to train another classification model (such as the ResNet 101 in FIG. 9B), so that the classification model can be used for fine-grained recognition of the vehicle logo. Further, to improve precision of the classification model, the foregoing target dataset annotated with the vehicle logo label may be used to retrain the classification model, to fine adjust the classification model.

Then, a to-be-recognized vehicle picture may be input into the classification model (such as the ResNet 101 in FIG. 9B), and the classification model recognizes a vehicle logo.

In this application, a small quantity of target datasets may be used to annotate a vehicle logo label for a large amount of data in the source dataset, and the source data may be further used for training to obtain a fine-grained recognition model for recognizing a vehicle logo, thereby avoiding a problem that for an existing fine-grained recognition model, due to a lack of a sample with a fine-grained annotation in a training set during model training, overfitting occurs when a trained fine-grained recognition model performs recognition, which affects recognition precision.

Application Scenario 2: Mobile Phone Terminal

With rapid growth of the national economy, rapid society progress, and continuous enhancement of national strength, people have more requirements for daily life entertainment, and a mobile phone has increasingly more photographing functions. In this application, an accuracy of photographing and recognizing an object by a mobile phone terminal can be significantly improved. For example, in a basic category such as food, flowers, birds, and dogs in a camera, fine-grained recognition of a food category, a flower category, a bird category, a dog category, and the like are further performed, to resolve a problem that it is difficult to recognize an object because features such as appearances and colors are similar.

For an existing fine-grained recognition model (a model for fine-grained recognition of a food category, a flower category, a bird category, a dog category, and the like), due to a lack of a sample with a fine-grained annotation in a training set during model training, overfitting occurs when a trained fine-grained recognition model performs recognition, which affects recognition precision.

Therefore, through data annotation in this application, a quantity of training samples may be increased, for example, a quantity of annotated data samples for each of the food category, the flower category, the bird category, and the dog category is correspondingly increased. Then, a large amount of annotated data is used to separately train fine-grained recognition models, and the fine-grained recognition models obtained through training are respectively used to recognize the food category, the flower category, the bird category, and the dog category, thereby avoiding a problem that for an existing fine-grained recognition model, due to a lack of a sample with a fine-grained annotation in a training set during model training, overfitting occurs when a trained fine-grained recognition model performs recognition, which affects recognition precision.

Application Scenario 3: Traffic Sign Recognition

A traffic sign includes abundant road traffic information, provides auxiliary information such as a warning and an indication to a driver, and plays an important auxiliary role in reducing driving pressure of a driver, reducing traffic pressure on a road, and decreasing a traffic accident occurrence rate. If this only depends on that a driver pays attention to and discovers a traffic sign and makes a correct response, it is inevitable that the driver's burden is increased, fatigue is accelerated, and a traffic accident may occur in a serious case. As a guide of a behavior criterion of a vehicle driving on a road, the traffic sign includes information such as "speed limit", "go straight", and "turn". Traffic sign recognition is mainly to collect traffic sign information on a road by using a camera installed on a vehicle, send the traffic sign information to an image processing module for sign detection and recognition, and make different countermeasures based on a recognition result. Traffic sign recognition can transmit important traffic information (for example, "speed limit" and "no overtaking") to a driver in time, and instruct the driver to make a proper response, thereby reducing driving pressure, reducing urban traffic pressure, and facilitating traffic safety on a road. Therefore, precise, efficient, and real-time traffic sign recognition is a trend of future driving.

In traffic sign recognition, a basic category refers to a traffic sign, and a fine grain refers to recognition of sign information such as "speed limit", " go straight", and "turn". For an existing model for fine-grained recognition of a traffic sign, due to a lack of a sample with a fine-grained annotation in a training set during model training, overfitting occurs when a trained fine-grained recognition model performs recognition, which affects recognition precision.

Therefore, through data annotation in this application, a quantity of training samples may be increased, for example, a quantity of annotated data samples for sign information such as "speed limit", " go straight", and "turn" in traffic signs is increased. Then, a large amount of annotated data is used to train a fine-grained recognition model, and the fine-grained recognition model obtained through training is used for fine-grained recognition of the traffic sign, thereby avoiding a problem that for an existing fine-grained recognition model, due to a lack of a sample with a fine-grained annotation in a training set during model training, overfitting occurs when a trained fine-grained recognition model performs recognition, which affects recognition precision.

Experimental Data and Effects of this Application

To fairly compare advantages and disadvantages of various fine-grained recognition algorithms, training and testing are performed in open datasets "CUB-200-2011" and "Stanford Cars" in this application. "CUB-200-2011" is a bird category dataset including 200 categories and 11788 pictures in total, where 5994 pictures are used as a training set, and 5794 pictures are used as a test set. "Bird" is a basic classification, and "bird category" is a fine-grained classification. "Stanford Cars" is a vehicle dataset including 196 categories and 16185 pictures in total, where 8144 pictures are used as a training set, and 8041 pictures are used as a test set. "Vehicle" is a basic classification, and "vehicle category" is a fine-grained classification.

Experiment on the method proposed in this application is performed in the foregoing two open datasets, and a result is shown in Table 1. Currently, the two datasets reach a leading level. Without increasing manual annotation costs and model complexity, training performed by adding self-annotated data reaches or even exceeds performance obtained by training performed through manual annotation. (Note: In Table 1 below, * indicates that additional data and annotation information are used)

TABLE 1

| Methods | Backbone | CUB-200-2011 | Stanford Cars |
|---|---|---|---|
| ResNet-101 | ResNet-101 | 86.0% | 92.6% |
| *ResNet-101 | ResNet-101 | 89.7% | 94.0% |
| RA-CNN | VGG-19 | 85.3% | 92.5% |
| MA-CNN | VGG-19 | 86.5% | 92.8% |
| MAMC | ResNet-101 | 86.5% | 93.0% |
| PC | DenseNet-161 | 86.9% | 92.9% |
| DFL-CNN | ResNet-50 | 87.4% | 93.8% |
| MPN-COV | ResNet-101 | 88.7% | 93.3% |
| *Iception-V3 | Iception-V3 | 89.6% | 93.5% |
| Solutions in this application | ResNet-101 | 89.4% | 93.6% |

Figure 13:
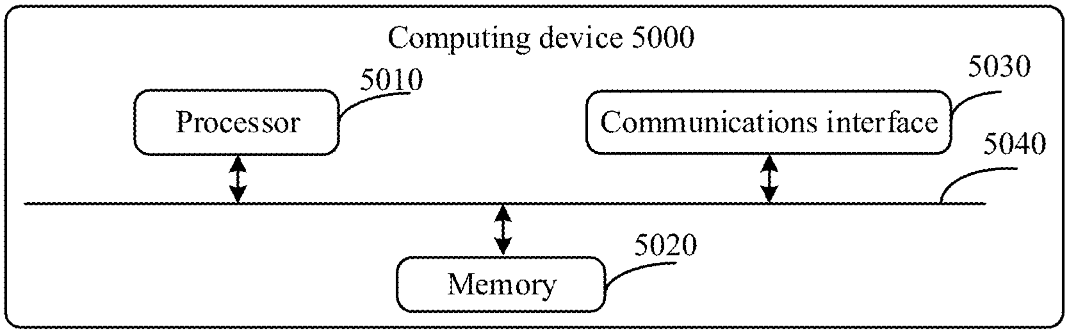
FIG. 13 is a schematic diagram of a structure of a computing device according to this application.

FIG. 13 is a schematic diagram of a structure of a computing device 5000 according to an embodiment of this application. The computing device 5000 includes a processor 5010, a memory 5020, a communications interface 5030, and a bus 5040.

It should be understood that the communications interface 5030 in the computing device 5000 shown in the figure may be configured to communicate with another device.

The processor 5010 may be connected to the memory 5020. The memory 5020 may be configured to store program code and data. Therefore, the memory 5020 may be an internal storage unit of the processor 5010, may be an external storage unit independent of the processor 5010, or may be a part including an internal storage unit of the processor 5010 and an external storage unit independent of the processor 5010.

In some embodiments, the computing device 5000 may further include the bus 5040. The memory 5020 and the communications interface 5030 may be connected to the processor 5010 by using the bus 5040. The bus 5040 may be a peripheral component interconnect (PCI) bus, an extended industry standard architecture (EISA) bus, or the like. The bus 5040 may be classified into an address bus, a data bus, a control bus, and the like. For ease of indication, the bus is indicated by using only one bold line in the figure. However, it does not indicate that there is only one bus or only one type of bus.

It should be understood that in this embodiment of this application, the processor 5010 may be a central processing unit (CPU). In some embodiments, the processor may be a general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like. In some embodiments, the processor 5010 may use one or more integrated circuits to execute a related program, to implement the technical solutions provided in embodiments of this application.

The memory 5020 may include a read-only memory and a random access memory, and provide an instruction and data for the processor 5010. A part of the processor 5010 may further include a nonvolatile random access memory. For example, the processor 5010 may further store information of a device type.

When the computing device 5000 runs, the processor 5010 executes computer execution instructions in the memory 5020 to perform the operation operations in the foregoing methods.

It should be understood that the computing device 5000 according to this embodiment of this application may correspond to a corresponding body performing the methods according to embodiments of this application, and the foregoing and other operations and/or functions of the modules in the computing device 5000 are separately used to implement corresponding procedures of the methods in embodiments. For brevity, details are not described herein.

A person of ordinary skill in the art may be aware that, in combination with the examples described in embodiments disclosed in this specification, units and algorithm operations may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of embodiments.

In addition, function units in embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

An embodiment of this application further provides a computer-readable storage medium, and the computer-readable storage medium stores a computer program. The program is executed by a processor to perform a diversified problem generation method, and the method includes at least one of the solutions described in the foregoing embodiments.

The computer storage medium in embodiments of this application may use any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or component, or any combination thereof. Examples (non-exhaustive list) of the computer-readable storage medium include: an electrically connected or portable computer disk with one or more wires, a hard disk, a random access memory (RAM), a read-only memory (ROM), an erasable programmable read-only memory (EPROM or flash), an optical fiber, a portable compact disc read-only memory (CD-ROM), an optical storage device, a magnetic storage device, or any suitable combination thereof. In this document, the computer-readable storage medium may be any tangible medium that includes or stores a program, and the program may be used by or in combination with an instruction execution system, apparatus, or component.

A computer-readable signal medium may be included in a baseband or may be used as a data signal propagated as a part of a carrier, and carries computer-readable program code. The data signal propagated in this manner may be in a plurality of forms, including but not limited to an electromagnetic signal, an optical signal, or any suitable combination thereof. The computer-readable signal medium may be any computer-readable medium other than the computer-readable storage medium, and the computer-readable medium may send, propagate, or transmit a program used by or in combination with an instruction execution system, apparatus, or component.

The program code included in the computer-readable medium may be transmitted by using any suitable medium, including but not limited to wireless, a wire, an optical cable, RF, or any suitable combination thereof.

Computer program code for performing the operations in this application may be written in one or more programming languages or a combination thereof. The programming languages include object-oriented programming languages—such as Java, Smalltalk, and C++, and further includes conventional process programming languages—such as the "C" language or similar programming languages. The program code may be completely executed on a user computer, partially executed on a user computer, executed as an independent software package, partially executed on a user computer and partially executed on a remote computer, or completely executed on a remote computer or server. In a case including a remote computer, the remote computer may be connected to a user computer through any type of network, including a local area network (LAN) or a wide area network (WAN); or may be connected to an external computer (for example, may be connected to the external computer through the Internet by using an Internet service provider).

It should be noted that the foregoing merely describes embodiments of this application and the technical principle that is used. A person skilled in the art understand that this application is not limited to the embodiments described herein, and a person skilled in the art can make various obvious changes, readjustments, and replacements without departing from the protection scope of this application. Therefore, although this application is described in detail by using the foregoing embodiments, this application is not limited to the foregoing embodiments, but may include more other equivalent embodiments without departing from the concept of this application, which all fall within the protection scope of this application.

What is claimed is:

1. A data annotation method, comprising:

using at least two classification models with different structures, the at least two classification models comprising a first classification model and a second classification model;

pretraining the first classification model using a target dataset with a target annotation type label, wherein the target annotation type label includes a label from the first classification model and a label from the second classification model;

annotating a label for data in a to-be-annotated source dataset using the first classification model to produce initial data annotated with the label from the first classification model;

performing alternating training and data annotation a quantity of times, comprising using the initial data annotated with the label from the first classification model to train the second classification model, and comprising using a data annotated with the label from the second classification model to train the first classification model; and in the alternating training and data annotation, current training and current data annotation performed by a currently trained classification model, comprising at least one of the first classification model or the second classification model, comprise:

obtaining data that is re-annotated with a label by a previously trained classification model, comprising at least one of the first classification model or the second classification model, that is different than the currently trained classification model;

selecting a first part of the data to train the currently trained classification model, wherein the selecting the first part of the data is performed based on stability of an annotation of each piece of data, and wherein the stability is measured by using information entropy of soft label probabilities output by the previously trained classification model, and the selecting the first part of the data comprises:

calculating an information entropy value for each piece of the data based on the soft label probabilities for that label;

ordering the information entropy values in ascending order such that lower entropy indicates higher annotation stability; and selecting the first part of the data from a front of the ascending order; and re-annotating, by the currently trained classification model, respective labels for remaining data that is not included in the first part of the data.

2. The method according to claim 1, wherein the source dataset and target dataset have labels of a same basic classification; and the target annotation type label is a label of a further fine-grained classification in the basic classification.

3. A data annotation method, comprising:

using at least two classification models with different structures, the at least two classification models comprising a first classification model and a second classification model;

performing alternating training and data annotation a quantity of times, wherein, in the alternating training and data annotation, a part of data used for training the first classification model has a target annotation type label, wherein the target annotation type label includes a label from the first classification model and a label from the second classification model, and a data annotated with the label from the second classification model is used to train the first classification model; and in the alternating training and data annotation, current training and current data annotation performed by a currently trained classification model, comprising at least one of the first classification model or the second classification model, comprise:

obtaining data that is re-annotated with a label by a previously trained classification model, comprising at least one of the first classification model or the second classification model, that is different than the currently trained classification model;

selecting a first part of the data to train the currently trained classification model, wherein the selecting the first part of the data is performed based on stability of an annotation of each piece of data, and wherein the stability is measured by using information entropy of soft label probabilities output by the previously trained classification model, and the selecting the first part of the data comprises:

calculating the information entropy value for each piece of the data based on the soft label probabilities for that label;

ordering the information entropy values in ascending order such that lower entropy indicates higher annotation stability; and selecting the first part of the data from a front of the ascending order; and re-annotating, by the currently trained classification model, respective labels for remaining data that is not included in the first part of the data.

4. The method according to claim 3, wherein before the alternating training and data annotation are performed, the method further comprises: pretraining the first classification model by using a target dataset with the target annotation type label.

5. The method according to claim 3, wherein the data used to train the currently trained classification model has labels of a same basic classification; and the target annotation type label is a label of a further fine-grained classification in the basic classification.

6. A computer device, comprising:

a bus;

a communications interface, wherein the communications interface is connected to the bus;

at least one processor, wherein the at least one processor is connected to the bus; and at least one memory, wherein the at least one memory is connected to the bus and stores program instructions, and the at least one processor executes the program instructions to:

use at least two classification models with different structures, the at least two classification models comprising a first classification model and a second classification model;

pretrain the first classification model using a target dataset with a target annotation type label, wherein the target annotation type label includes a label from the first classification model and a label from the second classification model;

annotate a label for data in a to-be-annotated source dataset using the first classification model to produce initial data annotated with the label from the first classification model;

perform alternating training and data annotation a quantity of times, comprising using the initial data annotated with the label from the first classification model to train the second classification model, and comprising using a data annotated with the label from the second classification model to train the first classification model; and in the alternating training and data annotation process, current training and current data annotation performed by a currently trained classification model, comprising at least one of the first classification model or the second classification model, comprise:

obtain data that is re-annotated with a label by a previously trained classification model, comprising at least one of the first classification model or the second classification model, that is different than the currently trained classification model;

select a first part of the data to train the currently trained classification model, wherein the selecting the first part of the data is performed based on stability of an annotation of each piece of data, and wherein the stability is measured by using information entropy of soft label probabilities output by the previously trained classification model, and the selecting the first part of the data comprises:

calculate an information entropy value for each piece of the data based on the soft label probabilities for that label;

order the information entropy values in ascending order such that lower entropy indicates higher annotation stability; and select the first part of the data from a front of the ascending order; and re-annotate, by the currently trained classification model, respective labels for remaining data that is not included in the first part of the data.

7. The computer device according to claim 6, wherein the source dataset and target dataset have labels of a same basic classification; and the target annotation type label is a label of a further fine-grained classification in the basic classification.

8. A computer device, comprising:

a bus;

a communications interface, wherein the communications interface is connected to the bus;

at least one processor, wherein the at least one processor is connected to the bus; and at least one memory, wherein the at least one memory is connected to the bus and stores program instructions, and the at least one processor executes the program instructions to:

use at least two classification models with different structures, the at least two classification models comprising a first classification model and a second classification model;

perform alternating training and data annotation a quantity of times, wherein in the alternating training and data annotation, a part of data used for training the first classification model has a target annotation type label, wherein the target annotation type label includes a label from the first classification model and a label from the second classification model, and a data annotated with the label from the second classification model is used to train the first classification model; and in the alternating training and data annotation, current training and current data annotation performed by a currently trained classification model, comprising at least one of the first classification model or the second classification model, comprise:

obtain data that is re-annotated with a label by a previously trained classification model, comprising at least one of the first classification model or the second classification model, that is different than the currently trained classification model;

select a first part of the data to train the currently trained classification model, wherein the selecting the first part of the data is performed based on stability of an annotation of each piece of data, and wherein the stability is measured by using information entropy of soft label probabilities output by the previously trained classification model, and the selecting the first part of the data comprises:

calculate an information entropy value for each piece of the data based on the soft label probabilities for that label;

order the information entropy values in ascending order such that lower entropy indicates higher annotation stability; and select the first part of the data from a front of the ascending order; and re-annotate, by the currently trained classification model, respective labels for remaining data that is not included in the first part of the data.

9. The computer device according to claim 8, wherein before the alternating training and data annotation are performed, the at least one processor executes the program instructions to pretrain the first classification model by using a target dataset with the target annotation type label.

10. The computer device according to claim 8, wherein the data used to train the currently trained classification model has labels of a same basic classification; and the target annotation type label is a label of a further fine-grained classification in the basic classification.

* * * * *